US005742286A

United States Patent [19]

Kung et al.

[11] Patent Number: 5,742,286
[45] Date of Patent: Apr. 21, 1998

[54] GRAPHICAL USER INTERFACE SYSTEM AND METHOD FOR MULTIPLE SIMULTANEOUS TARGETS

[75] Inventors: Jonathan Sc Kung; James Lee Lentz, both of Austin, Tex.

[73] Assignee: International Business Machines Corporation, Armonk, N.Y.

[21] Appl. No.: 560,870

[22] Filed: Nov. 20, 1995

[51] Int. Cl.⁶ .................................................. G06F 3/00
[52] U.S. Cl. ................................... 345/349; 345/329
[58] Field of Search ................................ 395/326–358

[56] References Cited

U.S. PATENT DOCUMENTS

| | | |
|---|---|---|
| 5,041,992 | 8/1991 | Cunningham et al. |
| 5,315,703 | 5/1994 | Matheny et al. |
| 5,327,529 | 7/1994 | Fults et al. |
| 5,367,633 | 11/1994 | Matheny et al. |
| 5,428,734 | 6/1995 | Haynes et al. ........................... 395/349 |
| 5,606,674 | 2/1997 | Root ........................................ 395/346 |
| 5,608,860 | 3/1997 | Fitzpatrick et al. .................... 395/352 |

*Primary Examiner*—John E. Breene
*Attorney, Agent, or Firm*—Robert M. Carwell

[57] ABSTRACT

Source and target objects are differentiated by an attribute visible to the user and detectable by an application with source objects and target objects residing in respective containers. When a user desires to perform multiple source and target transfer operations, the desired collection of target objects is first selected by interaction with the target object container, including range selection or pointer device clicks, whereupon each selected target object indicates selection. Using similar operations, one or more source objects is selected, the user interface thereafter displaying a collection of selected target objects and one or more source objects shown with selection emphasis. The source objects are then moved using a standard transfer function from the source container to one of the target containers. In the target container, all valid selected target objects in view then provide acceptance feedback by a visual indication that each of these user-selected objects will accept the drop action. Upon releasing a pointing device button over a valid selected target objects, visual feedback indicates a successful transfer operation of a single or multiple source objects simultaneously to the multiple selected target objects.

9 Claims, 25 Drawing Sheets

5,742,286

GRAPHICAL USER INTERFACE SYSTEM AND METHOD FOR MULTIPLE SIMULTANEOUS TARGETS

TECHNICAL FIELD

This invention relates to graphical user interfaces in computer display systems and, more particularly, to improved systems and methods for user manipulation of objects in the interface.

BACKGROUND OF THE INVENTION

Recent development in computer science are now more effectively exploiting the potential power afforded by computer networks. More particularly, developments in distributed computing, multi-processor technology, remote file system access, and the like, have significantly increased the productivity, utility, and power of such networks which may range from installations with perhaps four or five computers to massive networks involving hundreds or thousands of terminals, workstations, and other computers linked together over the network.

One serious problem with such computer systems is the administration and management of such large numbers of resources and users. This has given rise to numerous software products seeking to ease the burden of network and systems administrators in maintaining, updating, and modifying the system and its various components.

One such class of powerful tools provides network administrators with a graphical interface which assists in installation of services on the network and management of users accessing the system and the resources they require. These graphical user interfaces seek to make the administrator's job easier in terms of monitoring and adjusting system resources required by various machines and nodes, monitoring and modifying the various authorizations and privileges granted to users with respect to differing machines and file systems, monitoring and altering security requirements as required, and the like.

As but one example of a typical tool now being provided to network administrators is a network install manager. This is essentially an application program which assists the administrator in specifying and managing a variety of installation services of host machines on a network. Prior to the advent of graphical user interfaces, such an administrator was forced to provide user command line inputs, sometimes with very arcane and complicated syntax and semantics requirements. These necessitated intimate knowledge of reams of network administration documentation involving protocols, procedures for granting access privileges, monitoring resource utilization, and the like.

In such network install managers, installation of resources typically would include base operating system files, file systems, and images. Differing types of machines are often supported in a network which may utilize different types of resources. In such a network install manager environment, install actions are performed on stand alone machines by creating a file system, and copying files and images to a hard disk located on a stand alone machine itself. On diskless machines in the networks, installation by the system administrators involves the initialization of certain file systems and files on a separate server machine. It should be readily apparent that due to the vast numbers of parameters needing to be changed in successfully administering a system, the advent of graphical user interfaces in network management was a long needed and welcomed improvement. An administrator may typically need to initiate install operations on multiple machines, and accordingly any techniques which facilitate simpler methods for initiating such multiple installations with fewer tasks would be extremely useful. In the evolution of the application of graphical user interfaces to network install and management tools, one technique that developed was the ability to enable resources to be installed on machines by dragging resource icons and dropping them on the desired machine icon. However, oftentimes it is desirable to perform an operation only on differing subsets of machines, files, applications, and other resources associated with the network. A serious limitation of current graphical interface systems for network management was thus the inability to adapt to this requirement. Although the provision for graphical user interfaces avoided the laborious task of utilizing command line input for these multiple alterations to a network, the present systems nevertheless required laborious and often repetitious commands through the graphical user interface to each individual file, resource, or the like.

SUMMARY OF THE INVENTION

It is therefore one object of the present invention to provide an improved system and method for managing computer networks.

It is yet another object of the invention to provide for an improved graphical user interface in network management.

Still a further object of the invention is to provide, in network management, simplified systems and methods for facilitating interaction between single and multiple source objects and multiple simultaneous target objects.

In accordance with a preferred embodiment of the invention, source and target objects preferably are first differentiated by an attribute visible to the user and detectable by an application, such as data file type sources and executable file type targets graphically resident in separate containers displayed on user interface display, with source objects residing in one container and target objects residing in another container.

When it is desired for the user, such as a network administrator, to perform multiple target transfer operations in which the source and target objects reside in such different containers as aforesaid, user-system interaction would consist of the following steps. First, the user would select by interaction with the target object container, the desired collection of target objects by any of a number of known techniques such as range selection, pointer device clicks, or the like, whereupon each such selected target object would evidence such selection by means of highlighting or the like.

Using similar operations, the user then, in like manner, selects one or more source objects, whereupon the user interface would then be displaying a collection of selected target objects showing selection emphasis and one or more source objects with selection emphasis.

The user then drags the source objects using a standard transfer function from the source container to one of the target containers. In the target container, upon so dragging the cursor over any selected target object, all valid selected target objects in view would provide a visual indication to the user that each of these user selected objects will accept the drop action. Acceptance feedback of this state is preferably provided by zone emphasis and some other appropriate technique. Depending upon the nature of the application, selected target objects not capable of accepting the source object drop would provide a rejection indication.

Upon releasing the pointing device button over a valid, selected target object, an appropriate visual feedback is provided indicating a successful transfer operation of the single or multiple source objects to the multiple selected target objects. Releasing the pointing device over a target object without selection emphasis which Is nevertheless a valid drop target results in performance of standard transfer operations of one or more source objects to a single target objects, with the other selected target objects not receiving the data transfer.

In an alternate embodiment, source and target objects are first preferably grouped into specialized iconized container objects. The source container would then be applied to the target container, and each object in the source container automatically applied to each object in the target container. In accordance with this alternate embodiment, the sequence of user interactions would include a user first grouping source objects into the aforesaid source container by dragging source objects on the user interface display and dropping them on the container, or the like. The user then groups target objects into a target container using a method similar to the source-grouping method.

The user then drags the source container to the target container, again using a standard user-interface transfer action. If the target container object and the source container object are compatible, the target container icon thence displays a visual indication that the container will accept the drop. The user then drops the source container icon on the target container icon, whereupon if the two container objects are compatible, appropriate visual feedback on the user interface is provided, indicating an accepted drop. The target container object then provides feedback on results of attempting to apply each of the source objects in the source container to each of the target objects in the target container.

In accordance with the foregoing system and methods, a network administrator may be thus effect changes to a multiplicity of target objects such as a group of network terminals, user authorizations, printers or other peripheral devices or the like, as desired, in essentially one operations, thereby obviating the need to interact individually with multiple target objects.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying figures wherein:

DETAILED DESCRIPTION OF THE PREFERRED EMBODIMENT

Figure 1A:
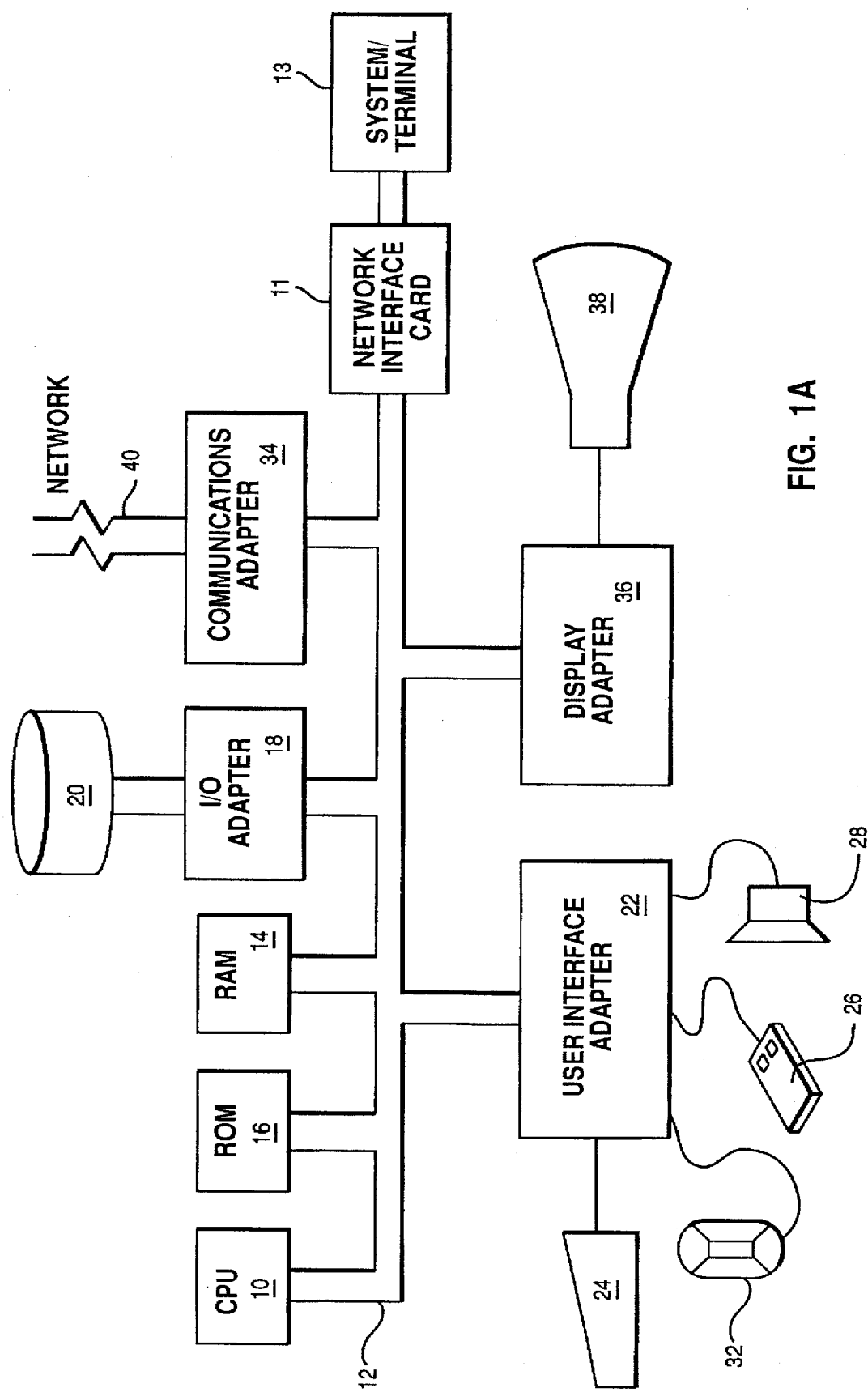
FIGS. 1A and 1B are pictorial representations of computer system which may be utilized to implement the system and method of the present invention.

Referring first to FIG. 1A, a representative computer system is shown in which the system and method for effecting actions associated with source object(s) on multiple simultaneous targets may be implemented effectively in accordance with the invention. The invention is advantageously employed in computer networks in which a system administrator is faced with the task of effecting operations associated with one or more objects on multiple targets as, for example, will be apparent in a typical system administration operation in which a set of privileges is to be granted to a number of users/machines in a subgroup. It will be recalled that heretofore this necessitated individual interactions and operations on each such target machine which could become unduly repetitive and burdensome to the system administrator. However, it should be readily apparent that the invention may also be advantageously employed in single computer installations wherein one or more source objects must be caused to interact with multiple target objects which, instead of being differing machines, file systems, or other resources as in the network case, may alternatively simply be multiple computer programs or files. An example of this may be simultaneously depositing an image object on multiple targets in a single computer system such as an image viewer, a multimedia authoring program, as an imported file into a text processor and a printer or trash can, for example. Accordingly, the invention is not intended to be so limited to applicability only to networks such as those shown in FIG. 1A.

FIG. 1A illustrates a preferred embodiment of a computer system which may advantageously employ the simultaneous multiple target install feature of the present invention. The system comprises a CPU 10, read only memory (ROM) 16, random access memory (RAM) 14, I/O adapter 18, user interface adapter 22, communications adapter 34, and display adapter 36, all interconnected via a common address/data/and control path or bus 12. Each of the above components accesses the common bus utilizing conventional techniques known to those of ordinary skill in the art, and includes such methods as dedicating particular address ranges to each component in the system, with the CPU being the busmaster. Other conventional techniques known to those of ordinary skill in the art employed in the system of FIG. 1A include direct memory access (DMA) used to transfer data at high speed from external devices such as DASD 20 or the network or the network shown to the data processing systems's RAM 14. As is further shown in FIG. 1A, these external devices such as DASD 20 interface to a common bus 12 through respective adapters such as I/O adapter 18. Other external devices, such as the display 38 similarly use their respective adapter such as display adapter 36 to provide data flow between the bus 12 and the display 38 or other device. Various user interface means are provided for interconnection and use with the user interface adapter 22 which, in the figure, has attached thereto representative user input devices such as a joy stick 32, mouse 26, keyboard 24, and speaker 28. Each of these units is well known as such and accordingly will not be described in detail herein. As will be hereinafter detailed, upon implementation of program code such as that described herein with reference to FIG. 4, the system of FIG. 1A will execute the program in order to effect the simultaneous multiple target installs.

The invention admits to implementation on essentially any computer system such as the RS/6000 (TM), workstations and personal computers of the IBM Corporation executing the AIX (TM) and OS/2 (TM) operating systems, respectively, or similar machines of other vendors.

Figure 1B:
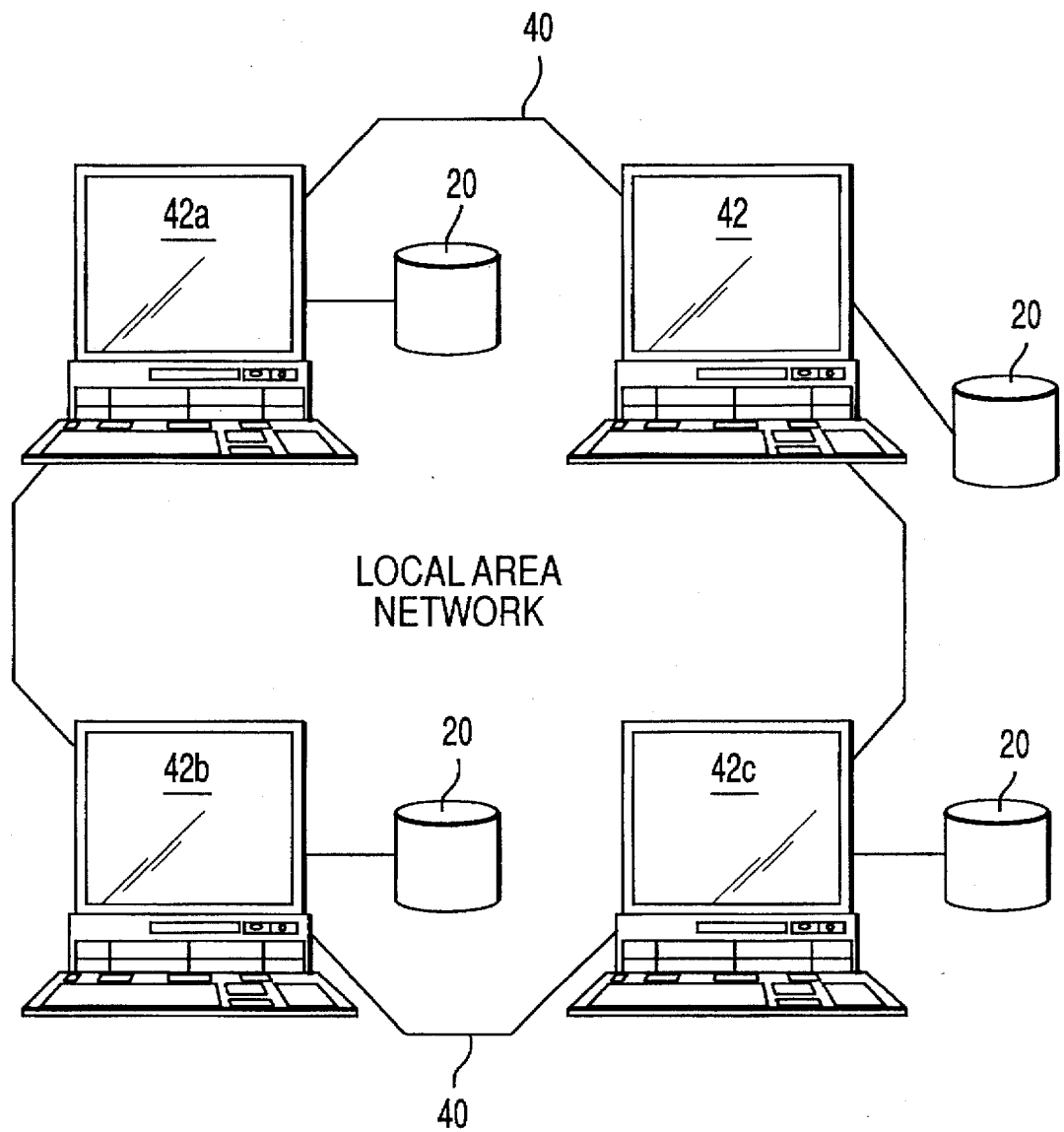

Also shown in FIG. 1A is yet another entire computer system or terminal 13 interconnected to the just-described computer system to the bus 12 by means of a network interface card 11 and appropriate communication protocols such as TCP/IP, Ethernet, slip connections whereby multiple computer systems (only an additional one of which is shown) may be connected. As will readily become apparent, it is a feature of the invention to provide for the simultaneous multiple target object placement at one of the computer systems accessed by the network administrator wherein he or she has displayed on the display 38, representations corresponding to the other machines on the network (whether it be other machines, file systems or storage devices, peripheral devices, or the like, serving as multiple sources and/or targets for manipulation by the administrator. FIG. 1B depicts a more conventional representation of a local area network 40 of computer 42a–42d with associated DASD in which the invention may be employed. Typically one of the computer will serve as a station for a network administrator from which he or she manages the net. The display of this station would be employed in accordance with the invention to display multiple targets corresponding to resources on the net with which the administrator will interact. Although just described, significant benefit may arise from simultaneous multiple target placement in such networks, of course benefits nevertheless obtain in simultaneous multiple target placements with respect to a single computer system.

Now that a description has been provided of a representative actual physical system in which the invention may be implemented, attention will be directed to FIGS. 2A–2J wherein a typical sequence of operations on such a system depicted in FIG. 1A may be seen represented in a sequence of user interface screens being changed by reason of user interaction with the system of FIG. 1A.

In graphical software user interfaces, it will be recalled that a "drag and drop" operation is a common direct manipulation technique for performing a variety of actions on a system. A typical example involves the transfer of data which is performed by selecting one or more source objects (e.g., files represented by icons) and then dragging them to a single destination object—either a file, application, or container). As previously described, in these prior art operations, there is invariably only one target object, although in real life, it is frequently desired to be able to simultaneously interact with multiple target objects. In order to so act on multiple targets, the drag and drop action unfortunately needed to be repeated for each such multiple target. It is a significant feature of the invention to provide for such drag and drop techniques for actions involving one or more source objects and these multiple target objects.

Figure 2A:
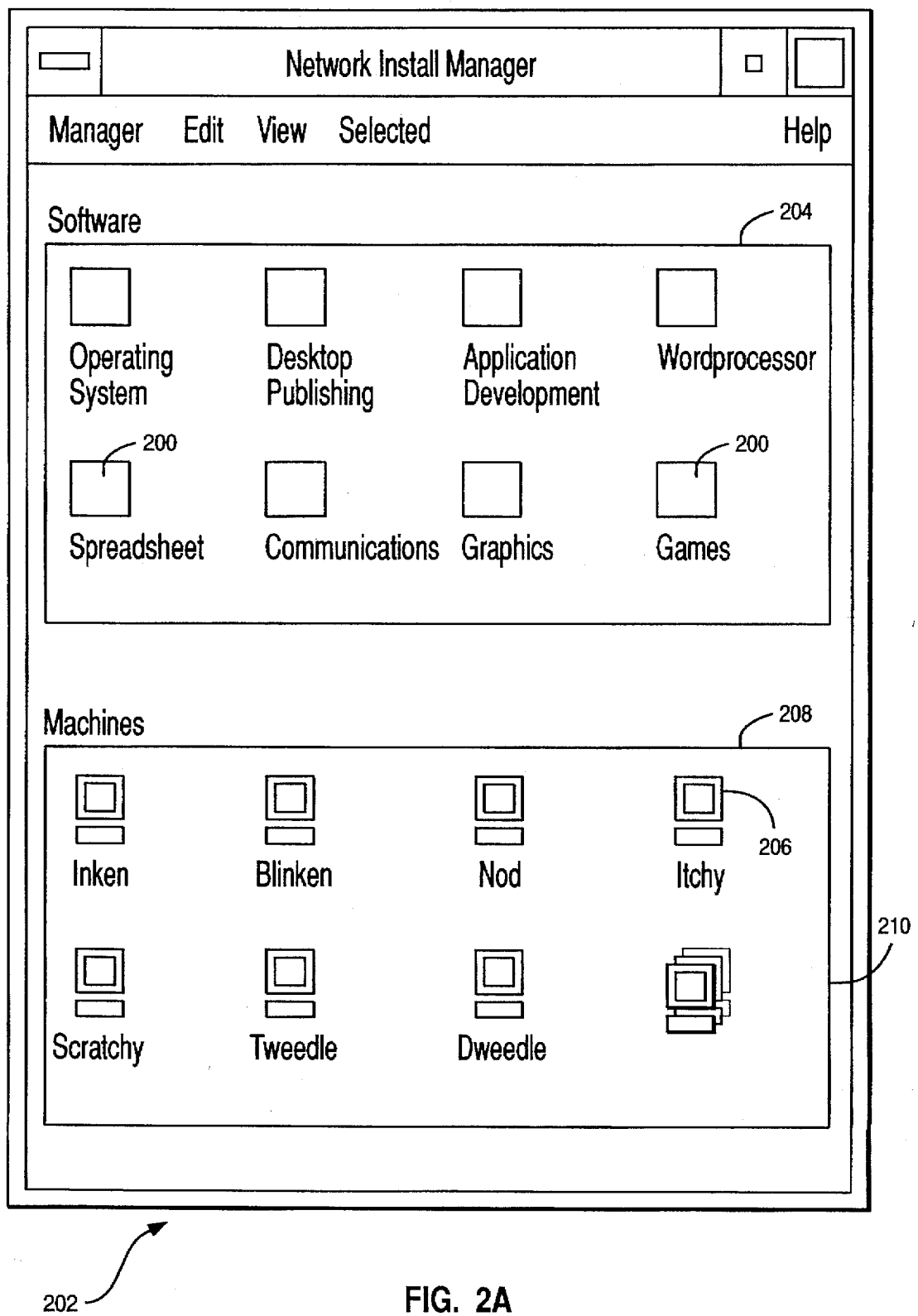
FIGS. 2A–2J is a sequence of representative user interface screens occurring in a typical operation in accordance with the invention dropping source object(s) to multiple simultaneous target objects in a preferred embodiment.

Turning now more specifically to FIG. 2A, there is shown a typical user interface screen such as might appear on the display 38 of FIG. 1A. Source and target objects are provided for which could be any of a variety of objects represented as icons such as icons 200 (representing data objects, application objects, device objects, container objects, or the like) as well as text objects, list objects, or other such objects.

In accordance with a preferred embodiment of a first method of the invention, the various objects appearing in the user interface 202 of display 38 are preferably differentiated by some attribute visible to the user and detected by the application which are well known in the art. Examples of such attributes include differing file types (e.g., data file type sources and executable file type targets) which may be resident in separate containers, e.g., source objects such as spread sheet object 200 would reside in one "container" represented by box 204 containing software and target objects such as a machine 206 may "reside" in the visual metaphor of another target "container" 210 shown as the box encompassing the various machines contained therein. When performing a multiple target transfer operation in accordance with the invention in which the source objects 200 and target objects 206 reside in different containers 204 and 210, for example, the user-system interaction would preferably be comprised of the following steps.

Figure 2B:
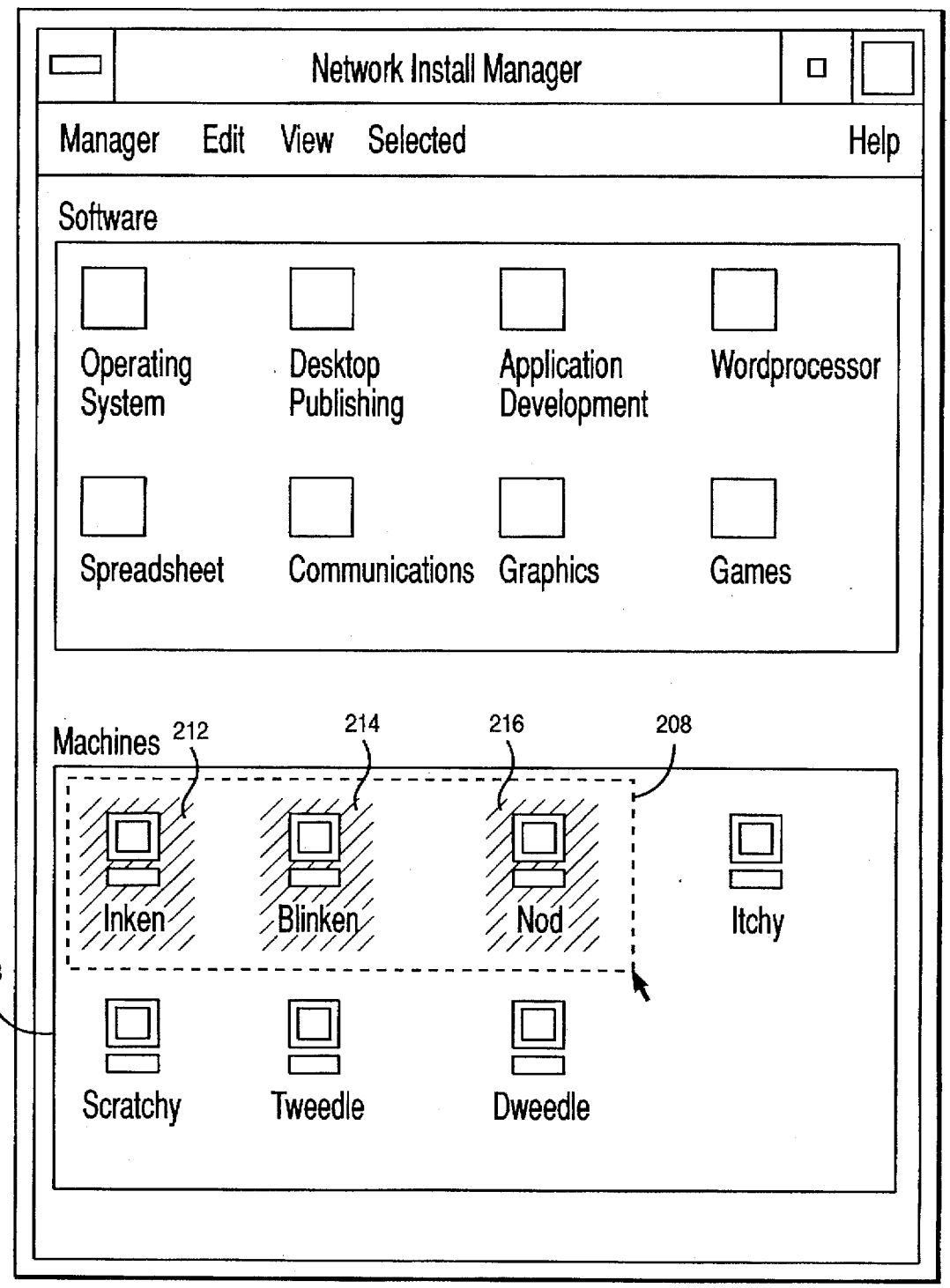
Figure 2C:
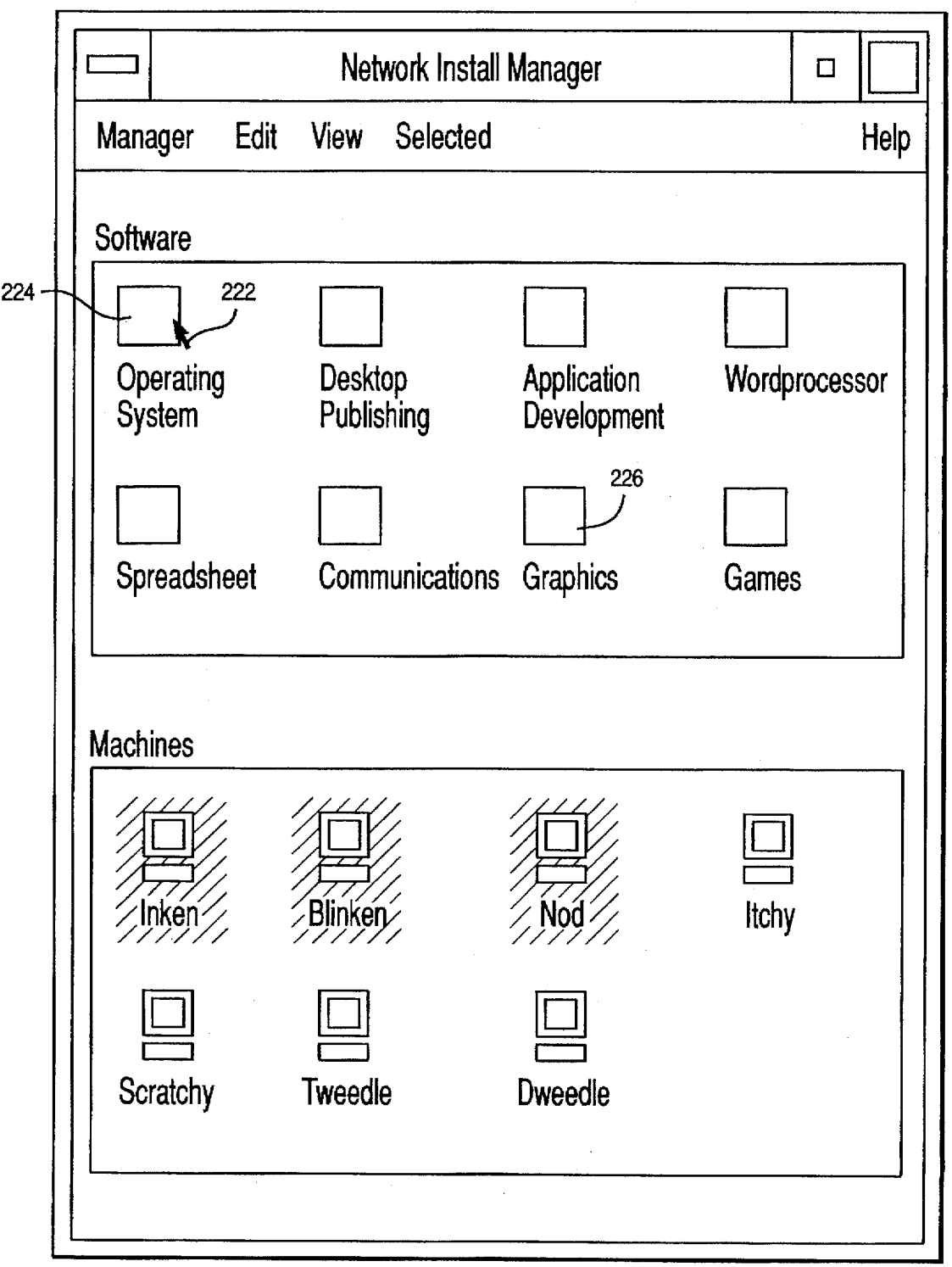

Beginning with the initial state of the user interface shown in FIG. 2A, a group of target objects such as target machines will first be selected using range selection and a direct multiple selection technique shown in FIG. 2B. More particularly, in the target object container 208, the user would employ any standard multiple selection technique to select a collection of target objects such as machines 212–216. These techniques could include, but not be limited to: range selection, extending single selections, or by using menu bar or pushbutton choices (for example, in familiar graphical user interfaces by selecting a "Select All" choice in a pulldown menu). Another example of these techniques is, for example, available in the widely used Motif user interface, which would be accomplished by a "BSelect-Click" operation on a first object such as machine 212, followed by adding additional objects by a "Control BSelect-Click" operation to encompass additional machines. As shown in FIG. 2B, by any such desired operation, and in accordance with standard selection techniques, each such selected object such as machines 212–216 would then be shown with selection emphasis such as shown by the dotted box 218 circumscribing the selected machines, reverse video highlighting (shown by the rectangles around each machine), or some other appropriate manner of providing of visual feedback to the user.

Figure 2D:
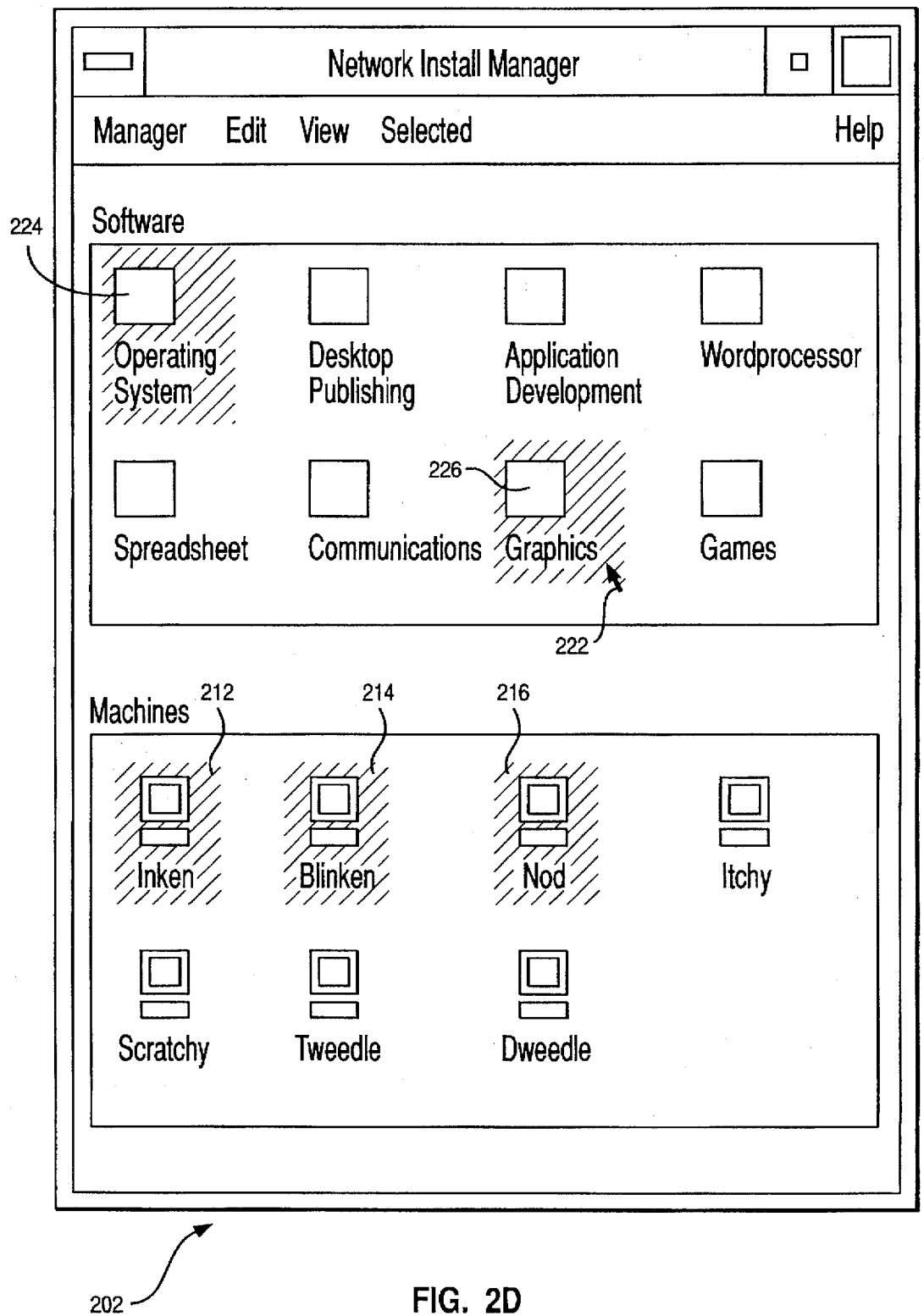

In one implementation of user interfaces, the rectangle 218 may be commenced up in a corner and by dragging the pointing device may be made to encompass any desired set of target objects, whereupon the selected target objects will be shown with selection emphasis such as the rectangles around machines 212–216 as shown in FIG. 2B. Using similar operations, the user would then select one or more source objects shown by the user positioning the cursor 220 over the source object "operating system" software shown by the cursor 222 in FIG. 2C positioned on the operating system icon 224. This process may be repeated as desired to select an additional source object such as the "graphics" source object 226 selected by the cursor 222. As this point, the user interface 202, as shown in FIG. 2D would then be displaying a collection of the target objects 212–216, showing selection emphasis, and one or more source objects 224–226 with selection emphasis or highlighting (such as the reverse video appearing in FIG. 2D).

Figure 2E:
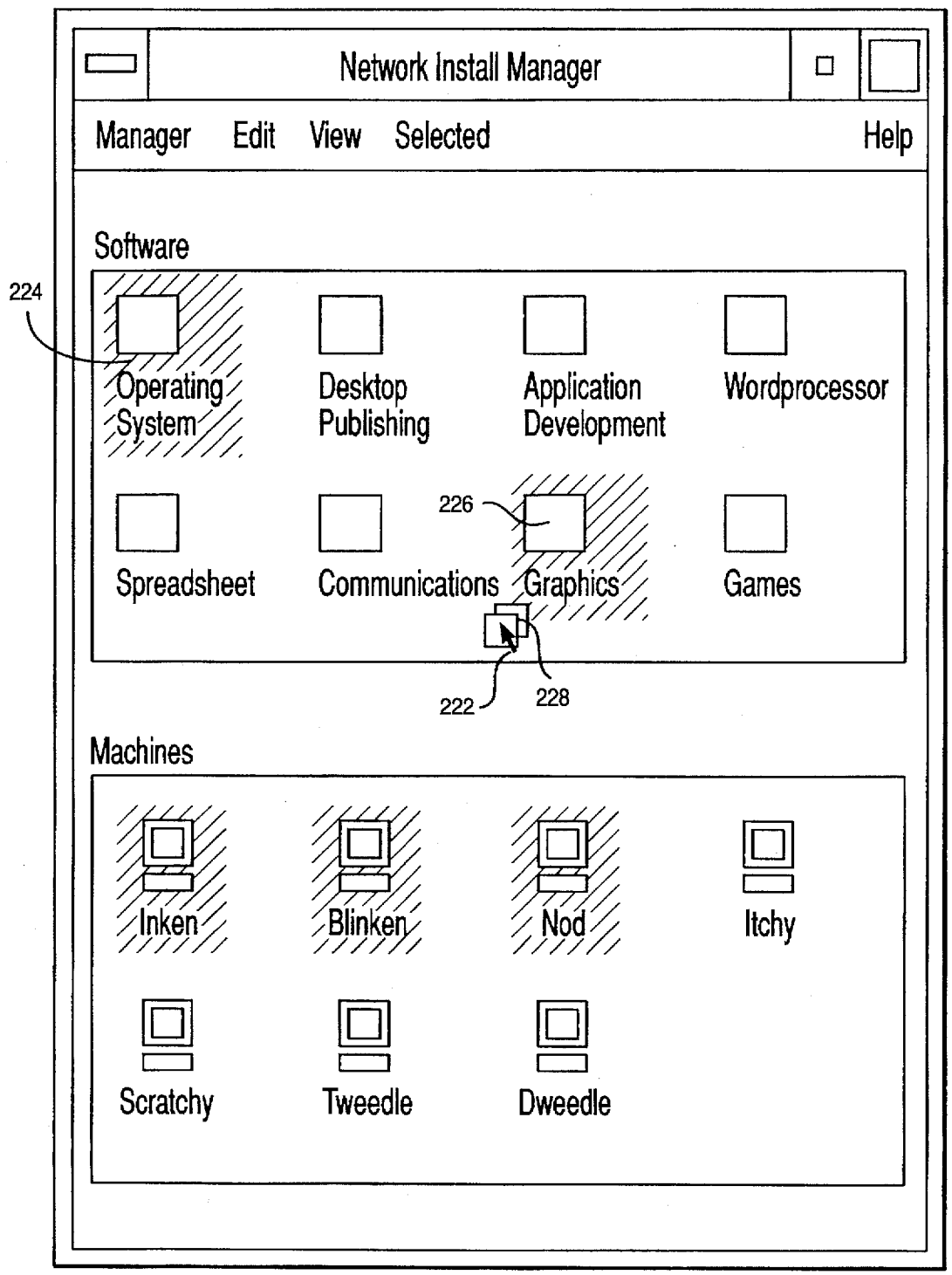

Next, the user would then drag thus-selected source objects (which alternatively, may simply be accomplished by dragging one of the source objects as representative of all of them), using a standard transfer action, as shown in FIG. 2E. In the typical interface such as the previously described Motif interface, this may be effected by a "BTransfer Press-Hold-Move" operation on one of the selected icons 224 or 226. Selection of one of the icons is shown by the icon 228 on which the cursor 222 appears.

Figure 2F:
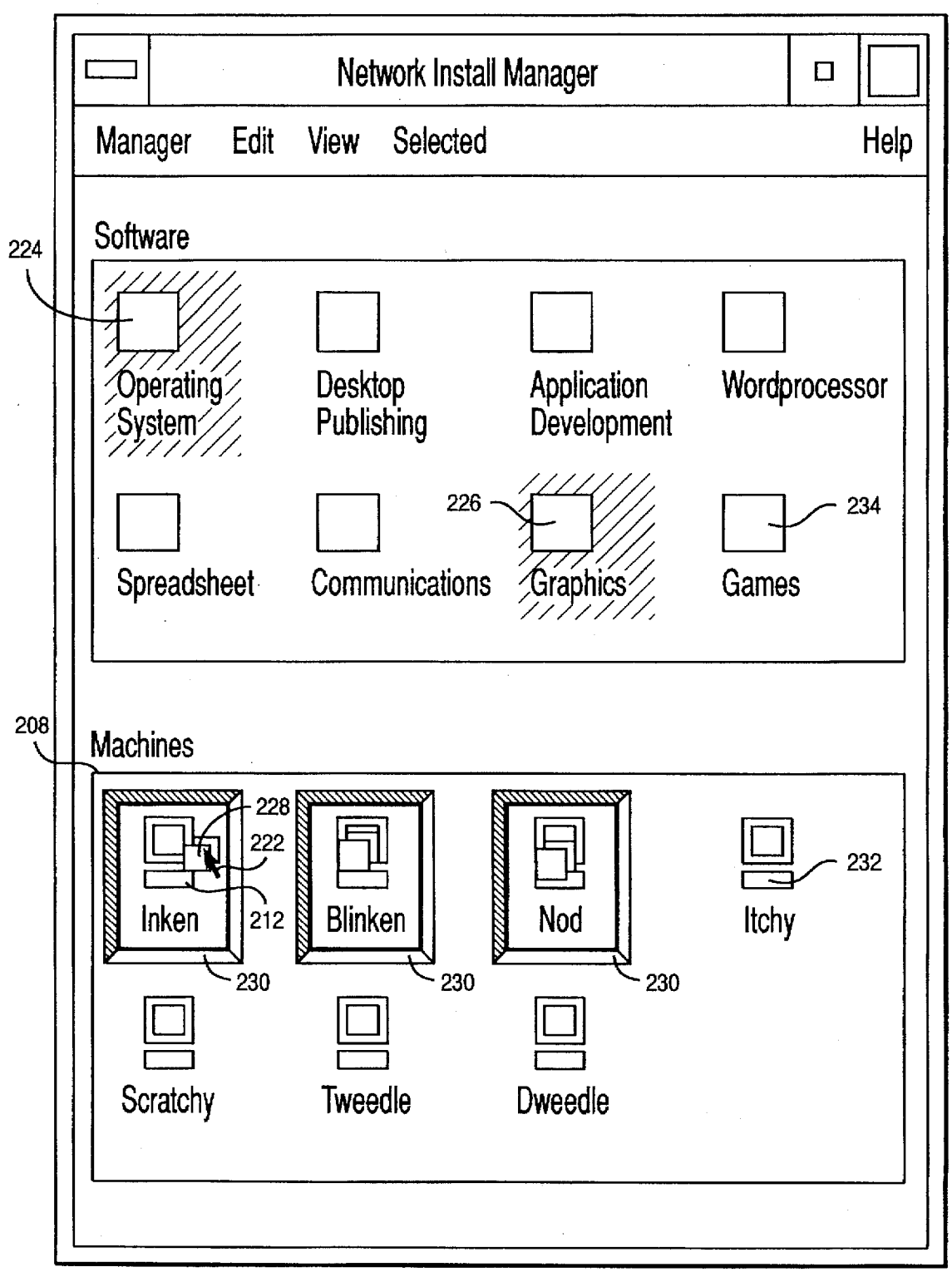

In FIG. 2F, it can be seen that this icon 228 representing the selected source objects 224 and 226 has been dragged into the machine container 208 (FIG. 2B) and, more specifically, has been positioned on the previously-selected target object of the machine 212 contained in container 208. Standard key augmentation for signifying a move, copy, or link-type of transfer could also be advantageously employed as desired.

Continuing with FIG. 2F, upon such dragging of the cursor 222 over any selected target object such as machine 212, all valid previously-selected target objects 212–216 in the view of the machine container 208 would then provide a visual indication to the user that each of these object will accept the drop action. Such acceptance feedback may be provided by any of a variety of techniques well known in the art including drop-down drop zone emphasis (the visual appearance of an area around the target icon changing so that it appears that the icon is located in a small "well"), and the replication of drag icons over each of the target icons. Specifically, with reference to FIG. 2F, white borders 230 are shown around each machine 212–216, and the drag icon 228 may, in like manner, be shown replicated on each of the target icons as desired. It is preferable that selected target objects which do not accept the drop could further provide a "reject" indication. At the least, it is preferable that selected target objects which reject the drop of source objects would not show acceptance feedback in the manner previously described. However, additionally it may be desirable to provide further indications such as loss of selection emphasis, a temporary change in the appearance of the target icons, a message dialog box listing the rejected objects, or some similar further indication.

Continuing with the description of the present method, in the preferred embodiment, if an attempt is made to release the pointing device such as the mouse by releasing the mouse button over a target object which does not have selection emphasis (such as the machine 232 in FIG. 2F), if that target object 232 is nevertheless still a valid drop target (even though not selected as described previously) the system and method of the invention would perform a standard transfer operation from one or more of the selected source objects such as object 224 to the single target object such as target object 232.

In such a case, the previously selected target objects 212–216 would not receive this data being transferred from the source object 234. They would, however, retain their selection emphasis as shown in FIG. 2F for a potential subsequent retry. If the source and target objects are differentiated by some other attribute (such as a file type) the operation of the invention previously described would occur in a similar fashion. However, in such case it would be preferable that the system or application would use context to determine which objects are source objects (e.g., data files) and which objects are target objects (e.g., applications or executable files).

Figure 2G:
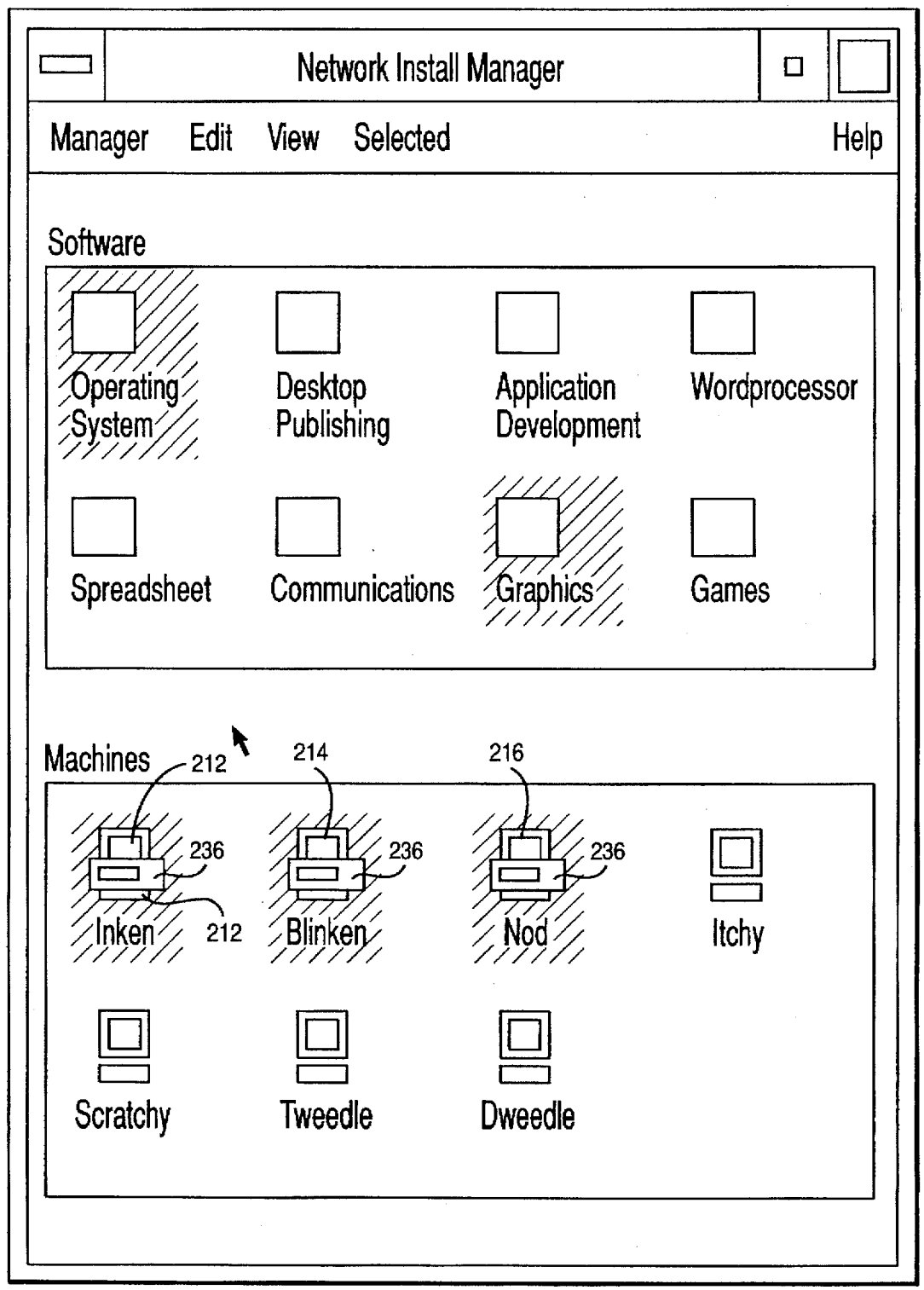
Figure 2H:
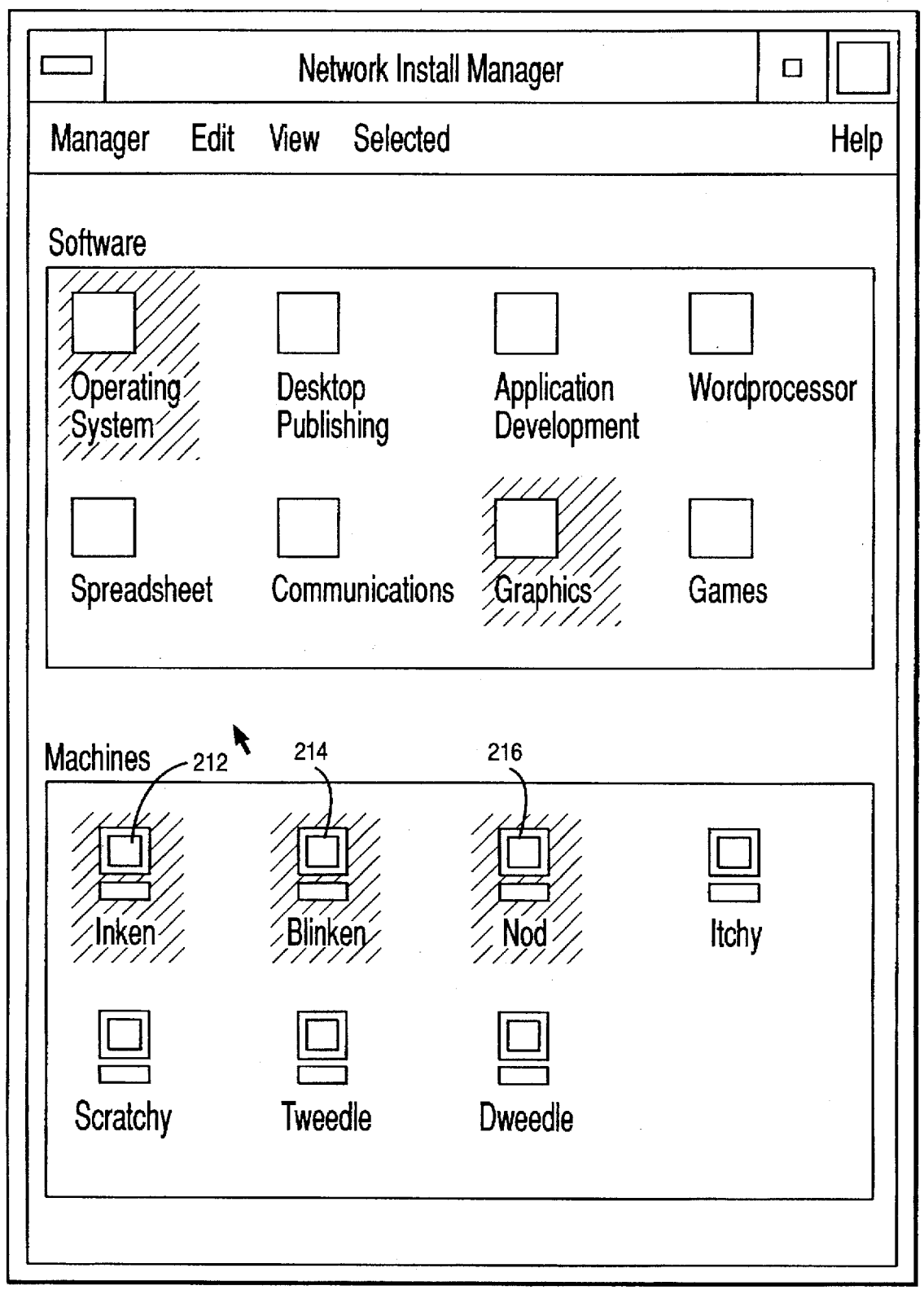

Comparison of FIGS. 2G and FIG. 2F indicates that the selected target objects 212–216 include a disk drive icon 236. The purpose of such an indicator is simply to reflect that these machine objects are providing feedback indicating that the source objects are effecting a change in the target objects which is in in progress. An inspection of FIG. 2H reveals that upon completion of such process, which, for example, may be an install process as but one example. These icons 236 disappear from their corresponding selected target objects, indicating that the install process has been completed. However, such target objects 212–216 will preferably be highlighted, indicating that they continue to remain selected for other potential operations until deselected.

Figure 2I:
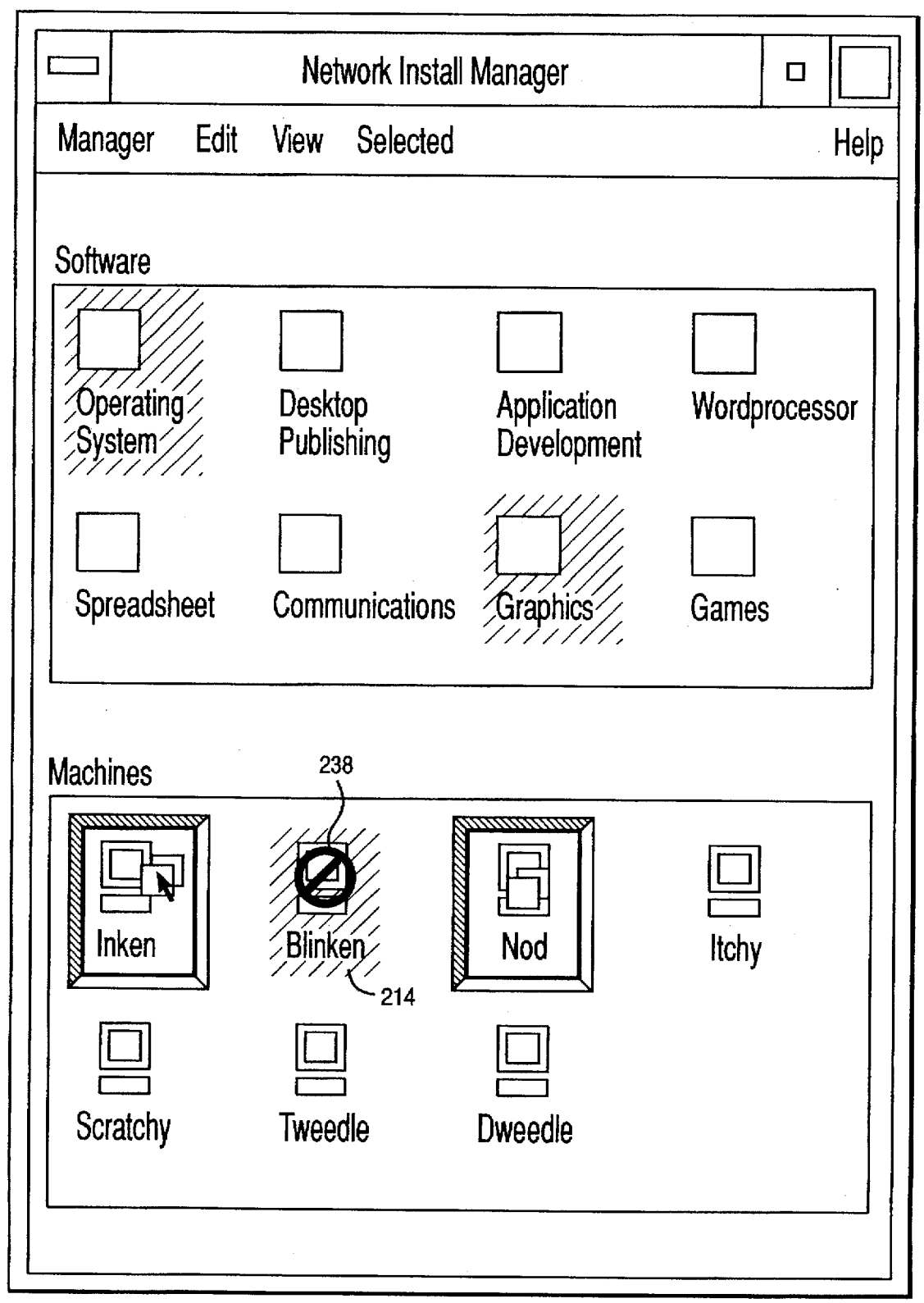

Referring now to FIG. 2I, it may be seen that for a particular selected target object such as machine 214, if it is such an object as to be incapable of accepting a drop of a selected source object, an indicator 238 will be provided on the machine 214 icon, thereby indicating to the user that the selected target object cannot accept a drop as indicated by this "reject" emphasis 238.

Figure 2J:
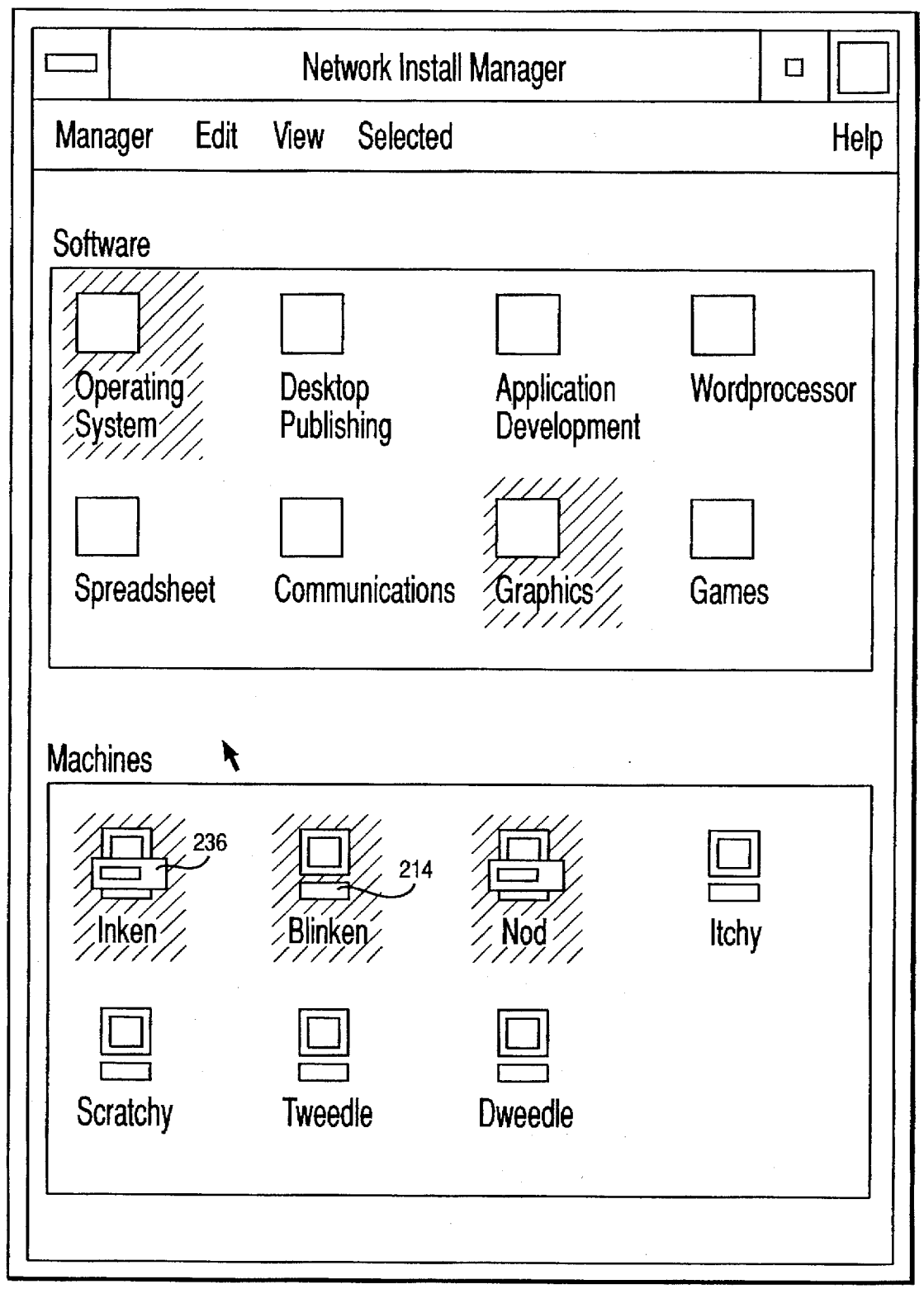

Further, reference to FIG. 2J indicates that not all target objects 212–216 during an install process reflect the ongoing install if they do not accept a drop. For example, in FIG. 2J, the target object 214 is missing the install icon 236 visible in FIG. 2G to illustrate that selected source objects cannot be installed on the target object 214.

The representative graphics shown for example in FIG. 2A–2J will be displayed on the display 38. As previously noted, the invention is particularly useful in the context of a network such as the local area network depicted in FIG. 1B, although it is equally useful with respect to individual computer systems such as that shown in FIG. 1A. One reason for the utility of the invention in such local area networks is because of the frequent need for system administrators to make identical changes on multiple targets such as multiple computers or workstations 42–42C operating on the local area network of FIG. 1B. Each such individual computer or workstation 42–42C may take any number of forms such as the individual computer described with reference to FIG. 1A, having individual storage such as DASD 20. However, in accordance with modern network technology, the network could be a heterogeneous collection of some workstations or terminals taking the place of one or more of the computers 42–42C, and further, the invention could be advantageously adapted to use in systems including multiple local area networks, wide area networks, and the like.

Turning now to FIGS. 3A–3L, an example of an alternate embodiment of the invention now be described with reference thereto. In the following manner, as before with respect to the FIG. 2 example, a plurality of software objects are shown within the software rectangle 300 and similarly a plurality of machines in a network are shown in the machine rectangle 302. Unlike in the example of FIG. 2, however, it will further be noted that an office software group 304 is further provided with respect to the software objects 300 and similarly a machine group 306 is provided with respect to the machine objects 302. In the initial state shown in FIG. 3A, however, the office group, 304, and machine group, 306, are empty.

Figure 3A:
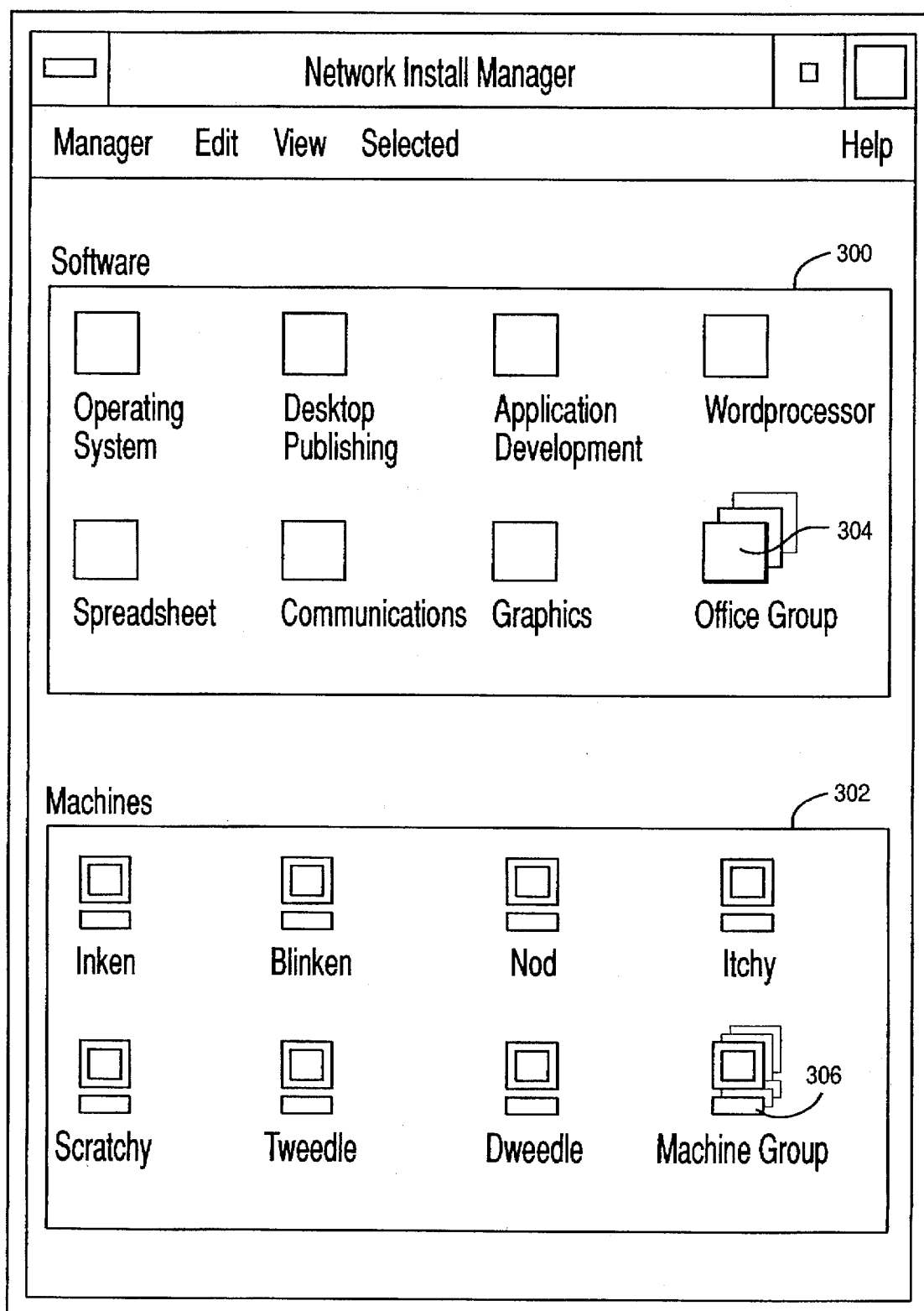
FIGS. 3A–3L is another sequence of user interface screen illustrating a different series of steps in an alternate embodiment of the invention for effecting the dropping of source object(s) to multiple simultaneous target objects.
Figure 3B:
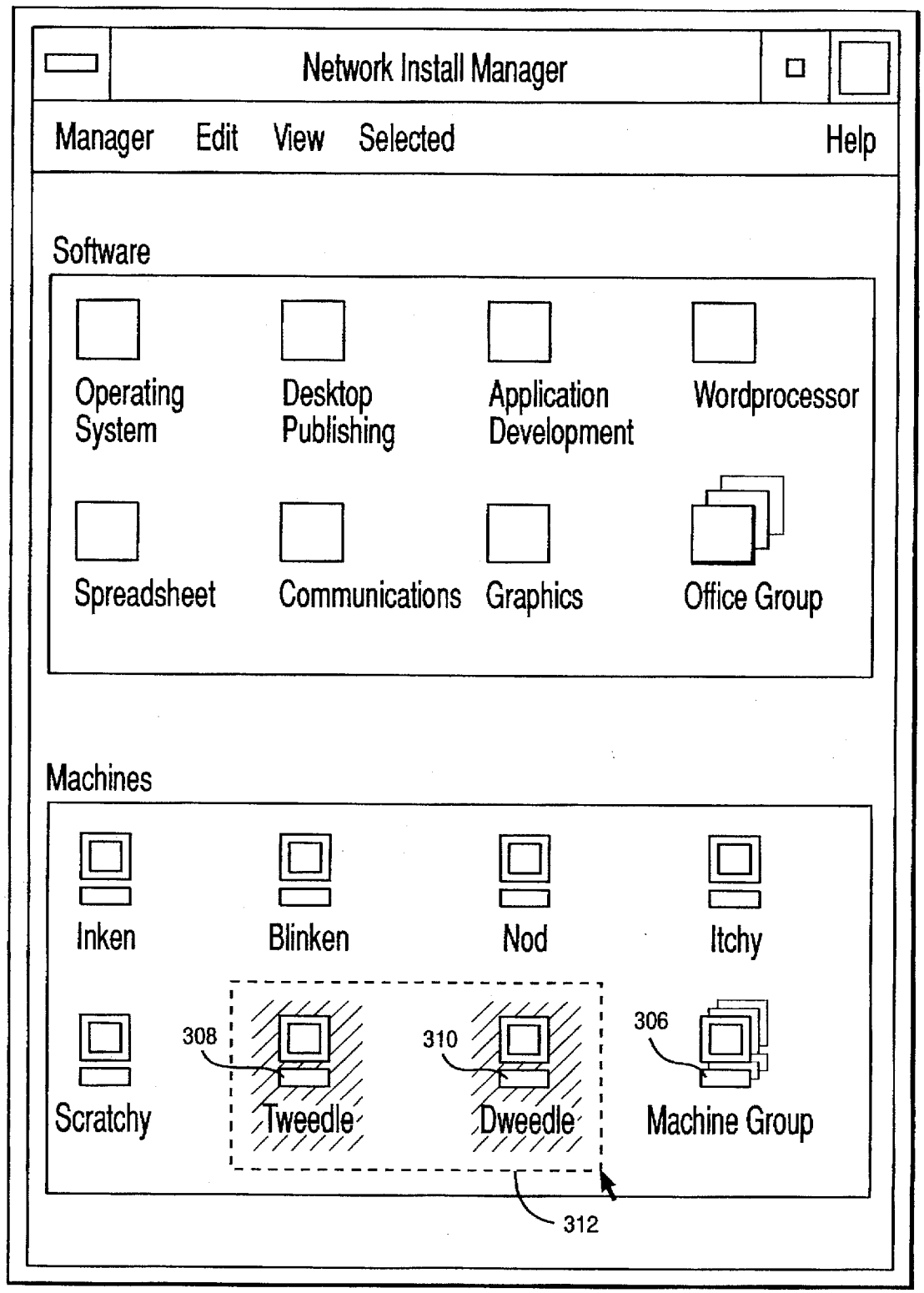
Figure 3C:
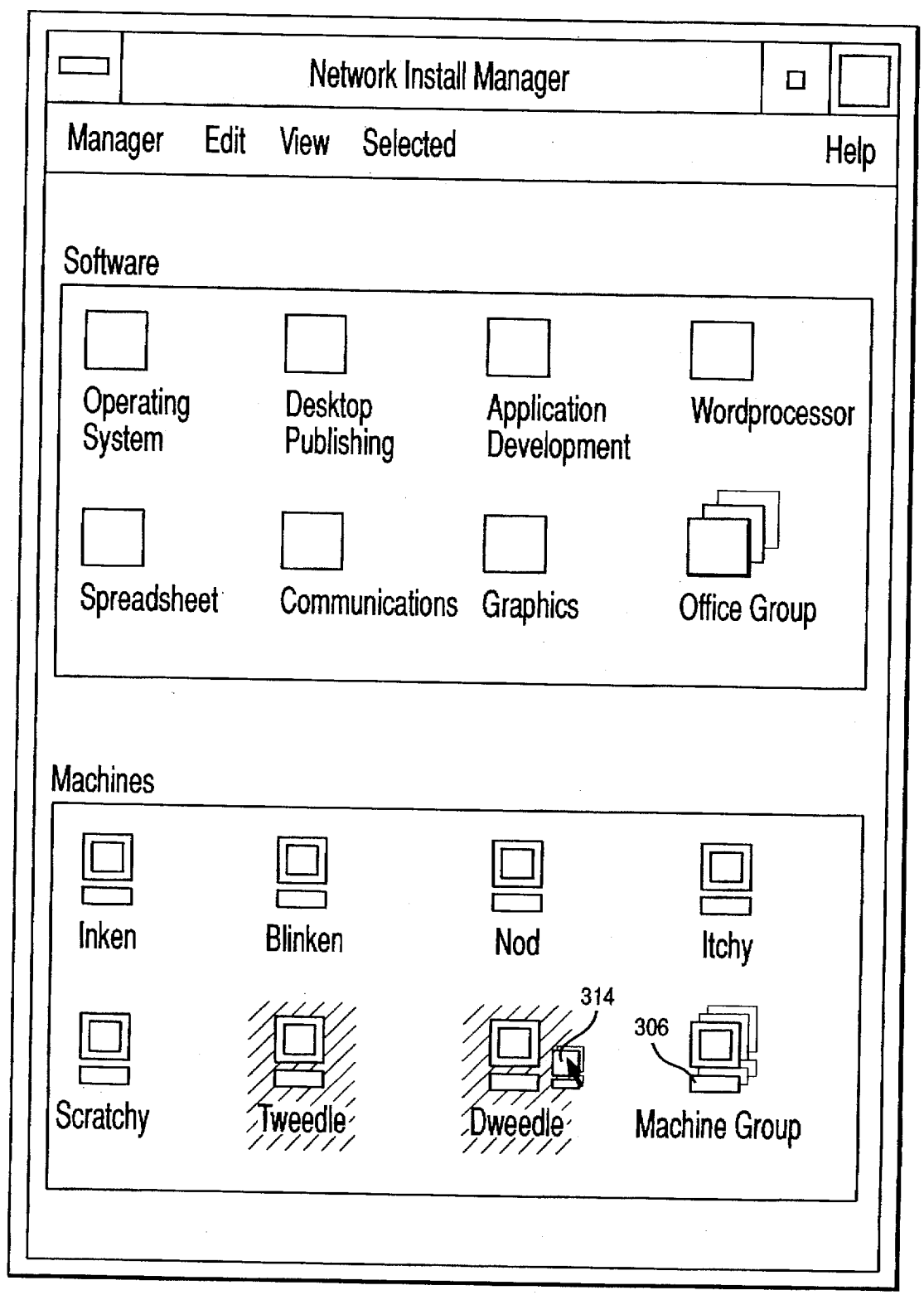
Figure 3D:
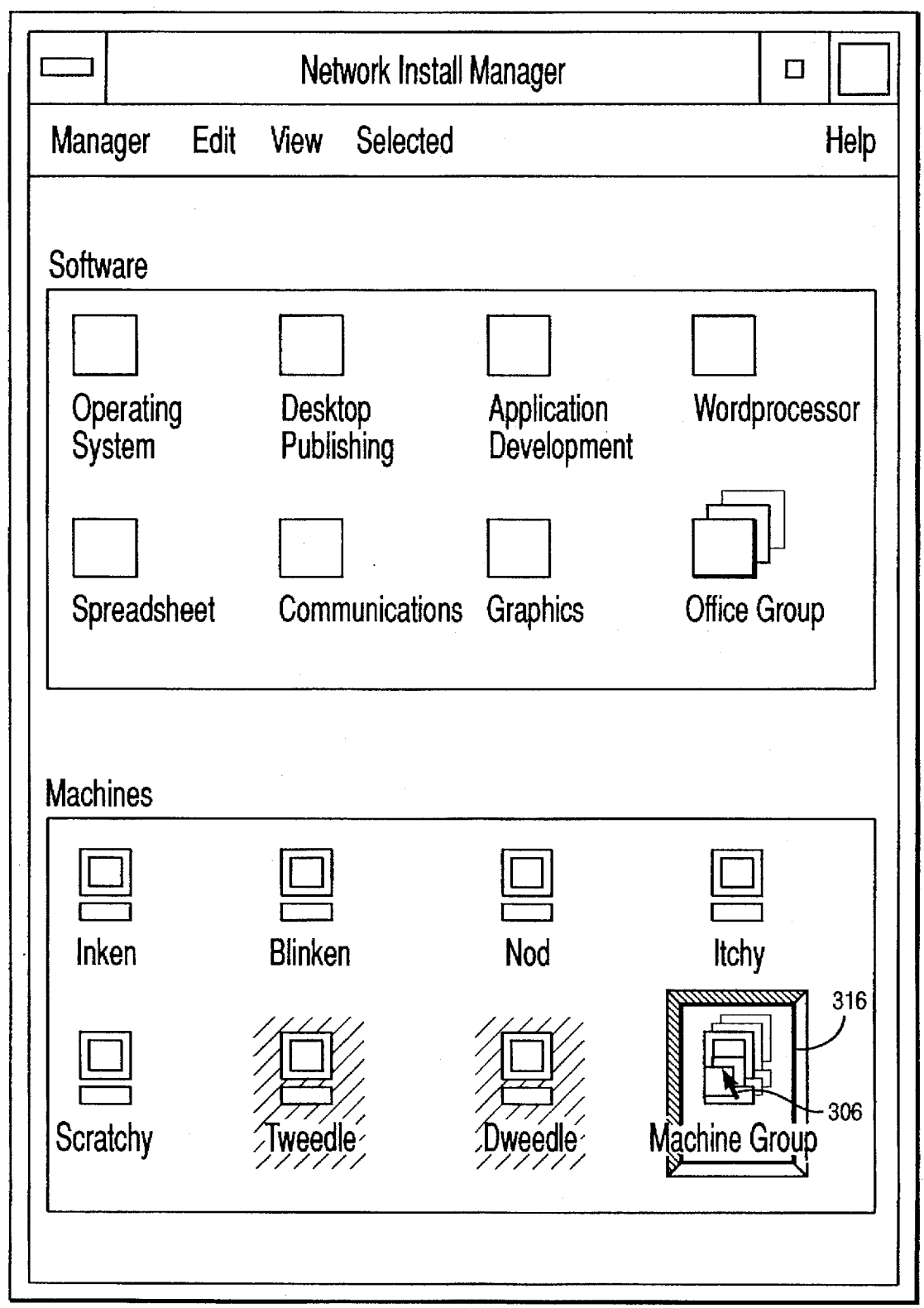

Referring now to FIG. 3B, in operation a user would first group selected target objects such as machines 308, 310 by any convenient means such as utilizing the pointer and a dotted box 312. Once the user groups desired target objects as thus indicated, this group would preferably be iconized as machine targets 314 of FIG. 3C. 314 represents a multiple object transfer pointer. This is a standard representation in drag/drop operations. The fact that two objects were selected and two are shown in the pointer is coincidental. This icon representing the selected machines will then be dragged to the machine group container 306, whereupon the machine group container 306 will change in appearance so as to indicate that it will accept the drop from the machines 308, 310. It will be noted in FIG. 3D that the machine group 306 now has a border 316 around it indicating the acceptability of the drop, and it will further be noted that the dotted box 312 of FIG. 3B has been removed in FIG. 3D after the grouping of the target machines as previously described.

Figure 3E:
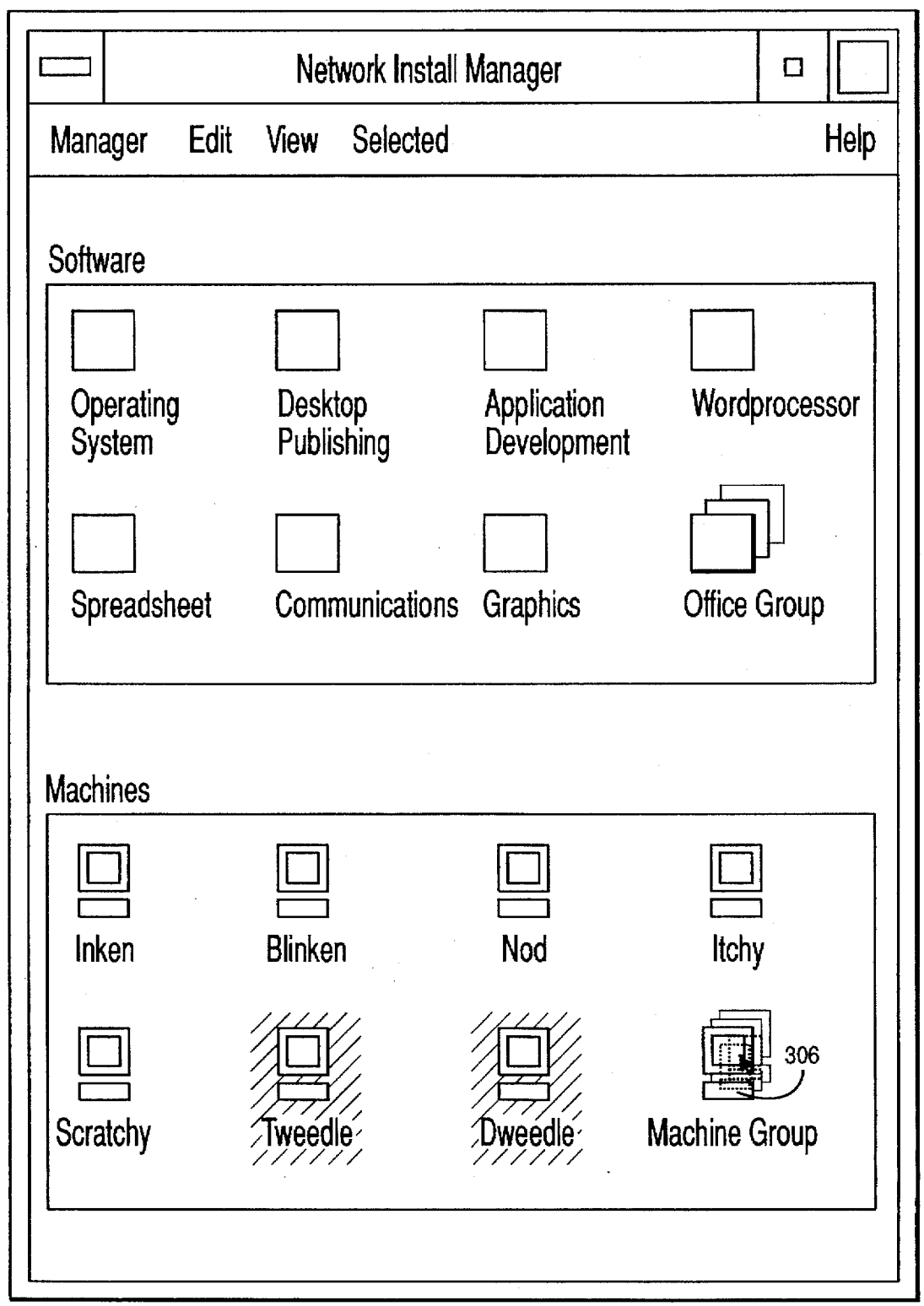

As shown in FIG. 3E, after the machine group container 306 has accepted the drop from machines 308, 310, the source icon will dissolve into the machine group icon 306.

Figure 3F:
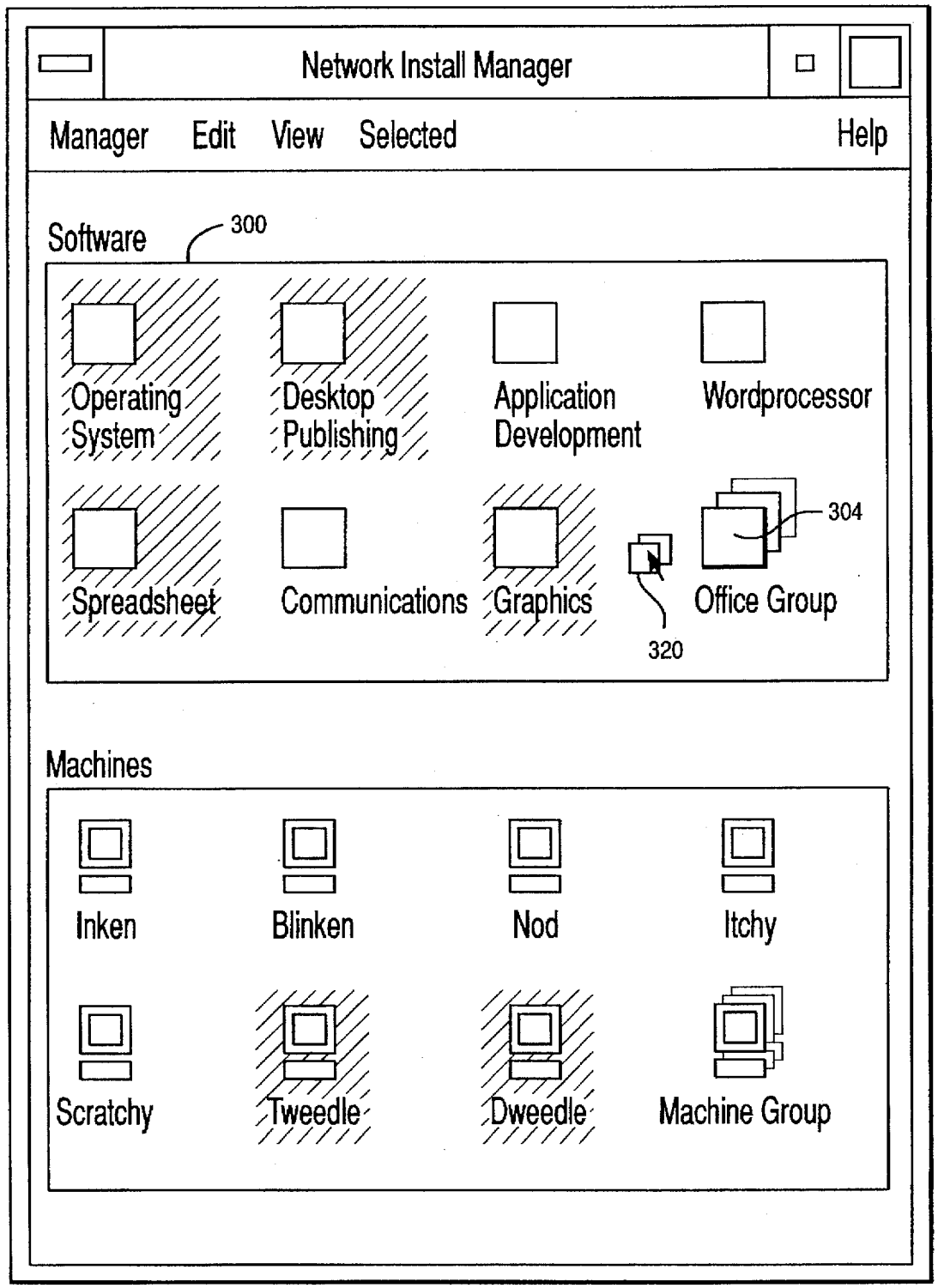
Figure 3G:
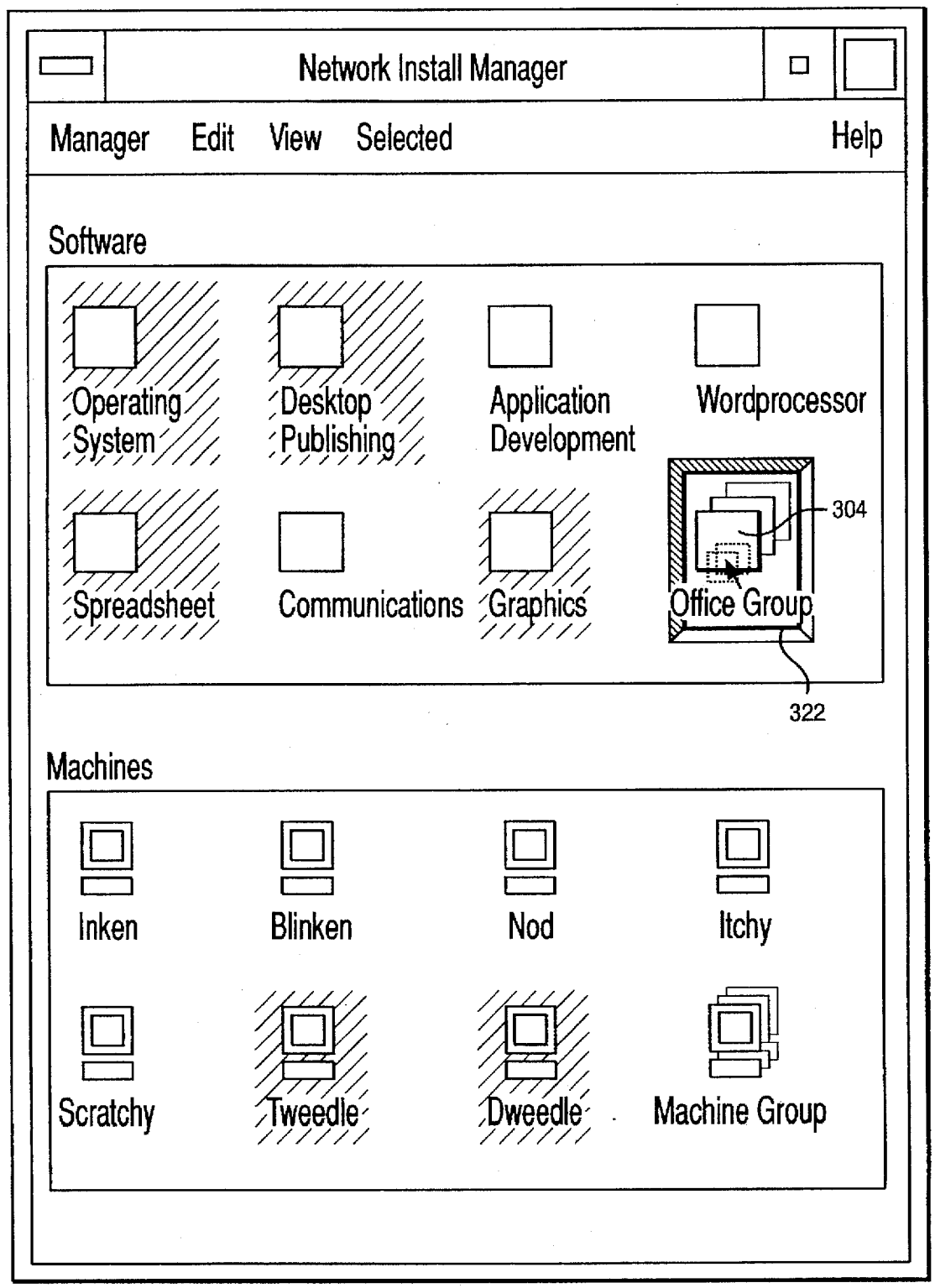

Referring now to FIG. 3F, a similar process will take place with respect to selected source objects contained within the rectangle 300 (FIG. 3F). More particularly, in like manner to the selection process for the machines, the user, by using an appropriate pointer device, will select certain desired source objects within the rectangle 300 as shown by the rectangles in the source rectangle 300 (FIG. 3F). Upon selection of this subgroup of source objects, they will be collectively iconized as shown by icon 320 in FIG. 3F. This icon 320 will then be dragged to the office group icon 304 and dropped on the office group container 304, FIG. 3G. It will noted that as with the machine group, a border 322 is provided around the office group icon 304, indicating that the office group container can accept the drop of the designated software source objects, FIG. 3G. Upon accepting the drop, the source icon 322 dissolves into the group icon 304, as shown in FIG. 3G. The office group software container 304 is then selected and dragged (as represented by icon 324) to the machines' target object area contained within the rectangle 302 (FIG. 3H)). It will be noted that individual target machine objects such as machines 308, 310, need not remain selected, as shown by their highlights. This is because any reselection within the machines' 302 rectangular area would cause them to lose such selection emphasis without affecting a subsequent drop action on the machine group icon.

Figure 3H:
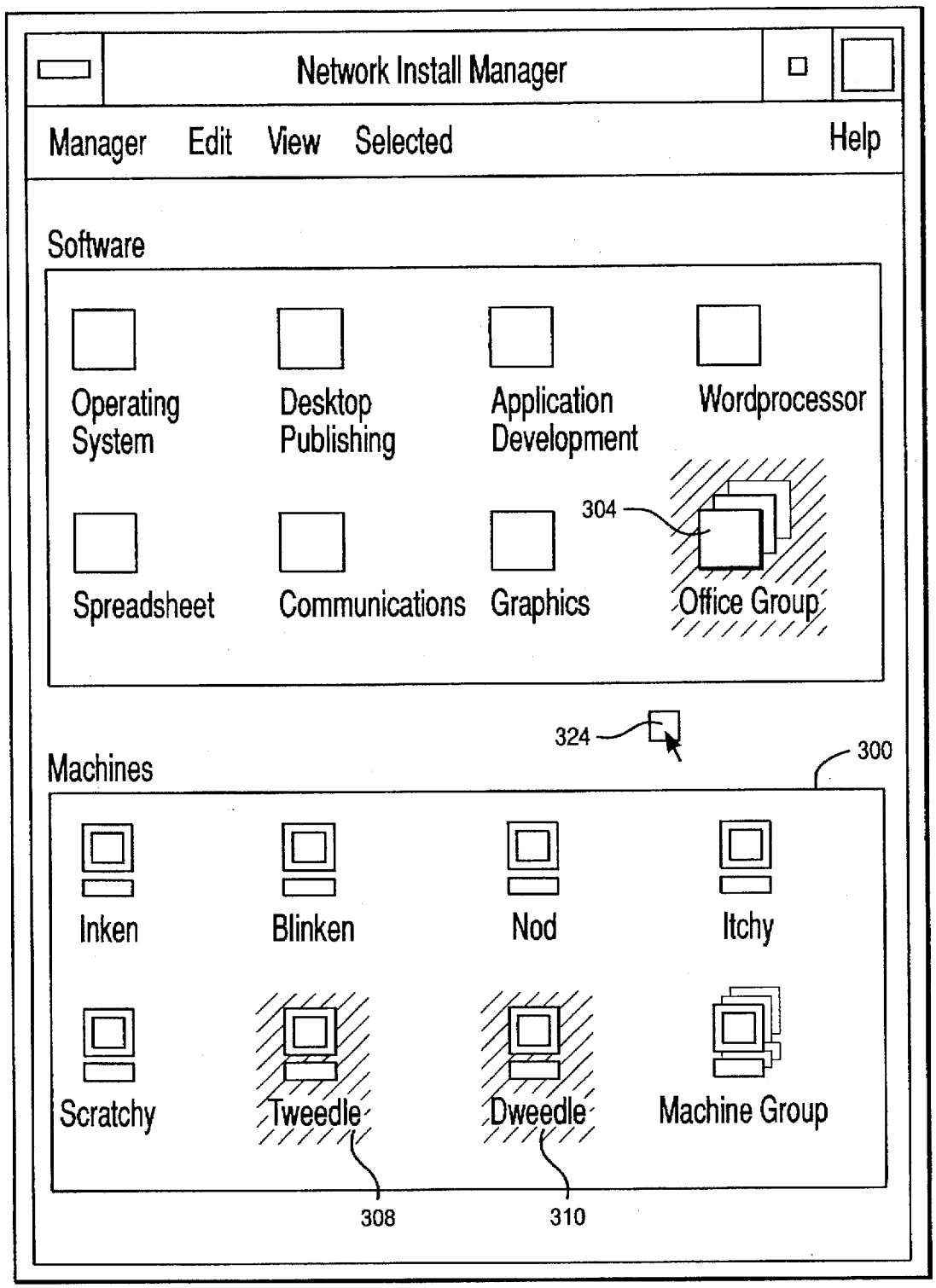
Figure 3I:
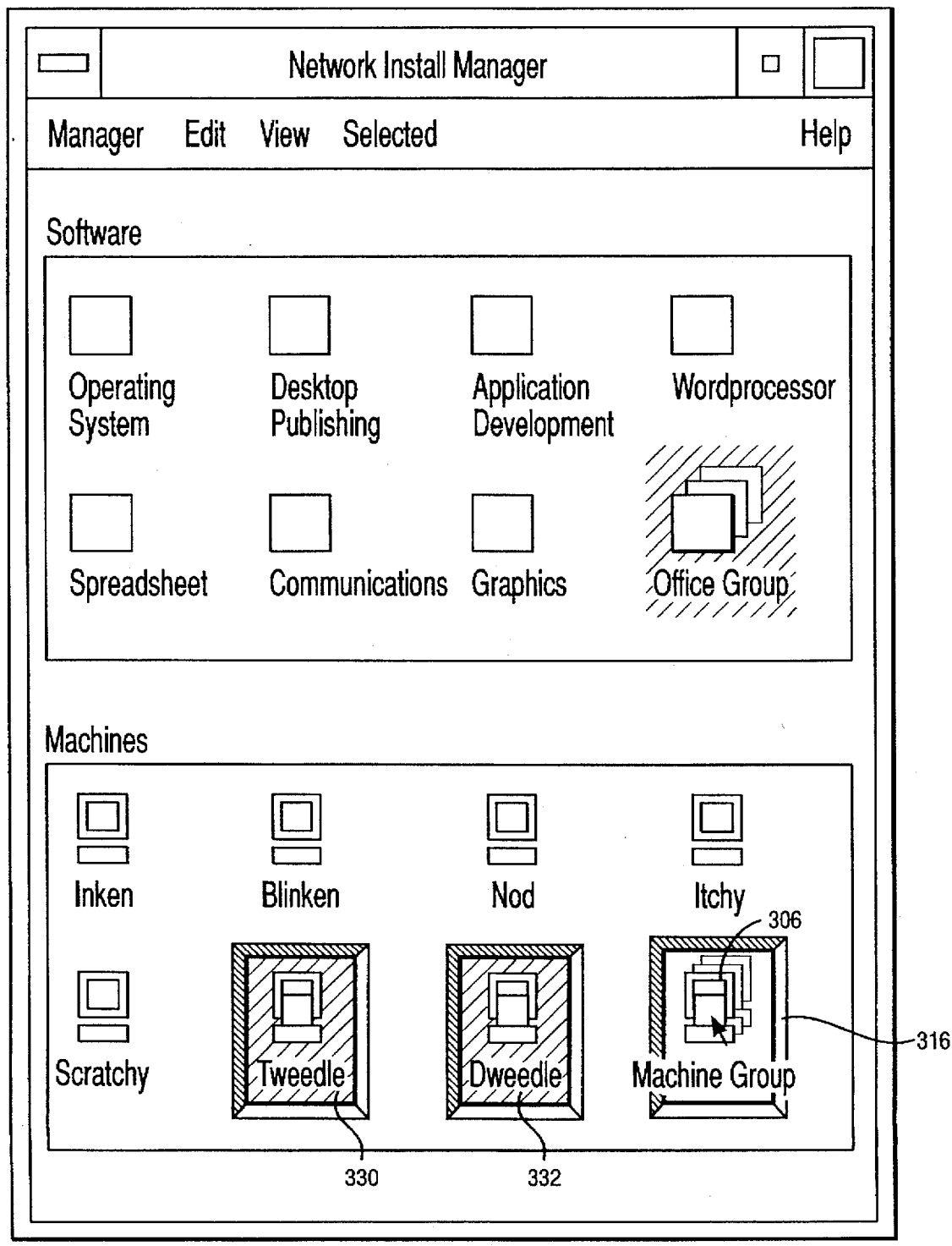

As shown in FIG. 3I, the office group container 324 of FIG. 3H is then dropped on the machine group container 306. Again, as with FIG. 3D, the machine group 306 has a border 316 indicating that it will accept the drop of selected source objects represented by the icon 324. It will further be noted that machines 308, 310 included in the machine group will also indicate that they will accept the drop, as shown by their borders 330, 332, respectively.

From the foregoing examples with respect to FIGS. 2A–2J and FIGS. 3A–3L, it will be apparent that multiple actions have occurred from a single or multiple source objects simultaneously on multiple selected target objects, simply by dragging an icon representing the source(s) objects to either a target container or one of the plurality of target objects selected. In this manner, the necessity for repetitive actions on each target object is thereby avoided, yielding an efficient manner for interacting with multiple targets.

It will be noted from the example in FIG. 3 that if target container objects and source container objects are compatible, the target container icon displays the visual indication that the container will accept the drop. To distinguish this type of transfer operation in which source objects are applied to each object in the container from standard transfer operations (in which the source objects would be applied to the container or included in it), a distinctive form of drop zone emphasis is provided. The user then drops the source container icon on the target container icon in the manner just described wherein if the two container objects are compatible, appropriate visual feedback is thereby provided (such as melt animation or the like) to show that the drop was accepted.

Also as just described, it is thus apparent that the target container object provides feedback to the user on the results of attempting to apply each of the source objects in the source container to each of the target objects in the target container. This feedback could be provided alternatively in the form of a message dialog box which lists which source objects were applied to which target objects. Feedback could also be provided by opening the target container icon into a view that displays its constituent target object icons, with some alteration in appearance for each target icon reflecting the status of an attempt to apply a source object to it.

Figure 3J:
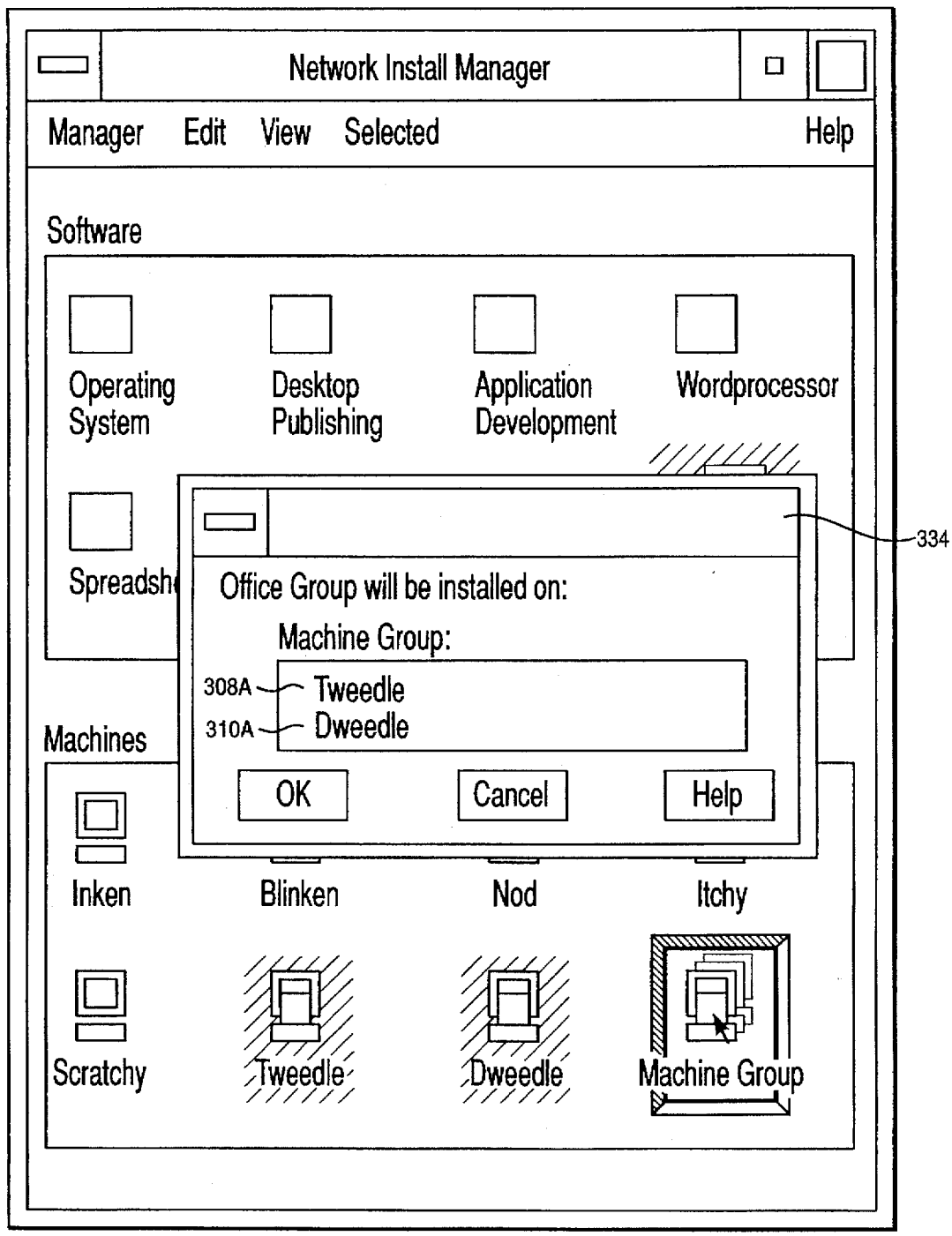

Referring to FIG. 3J, an alternative method of displaying drop status is shown therein. A message dialog box 334 may be provided to display machines as shown by lines 308A, 310A, corresponding to machines 308, 310, thereby signifying machines which will accept the install operation, machines which will reject the install operation, or both.

Figure 3K:
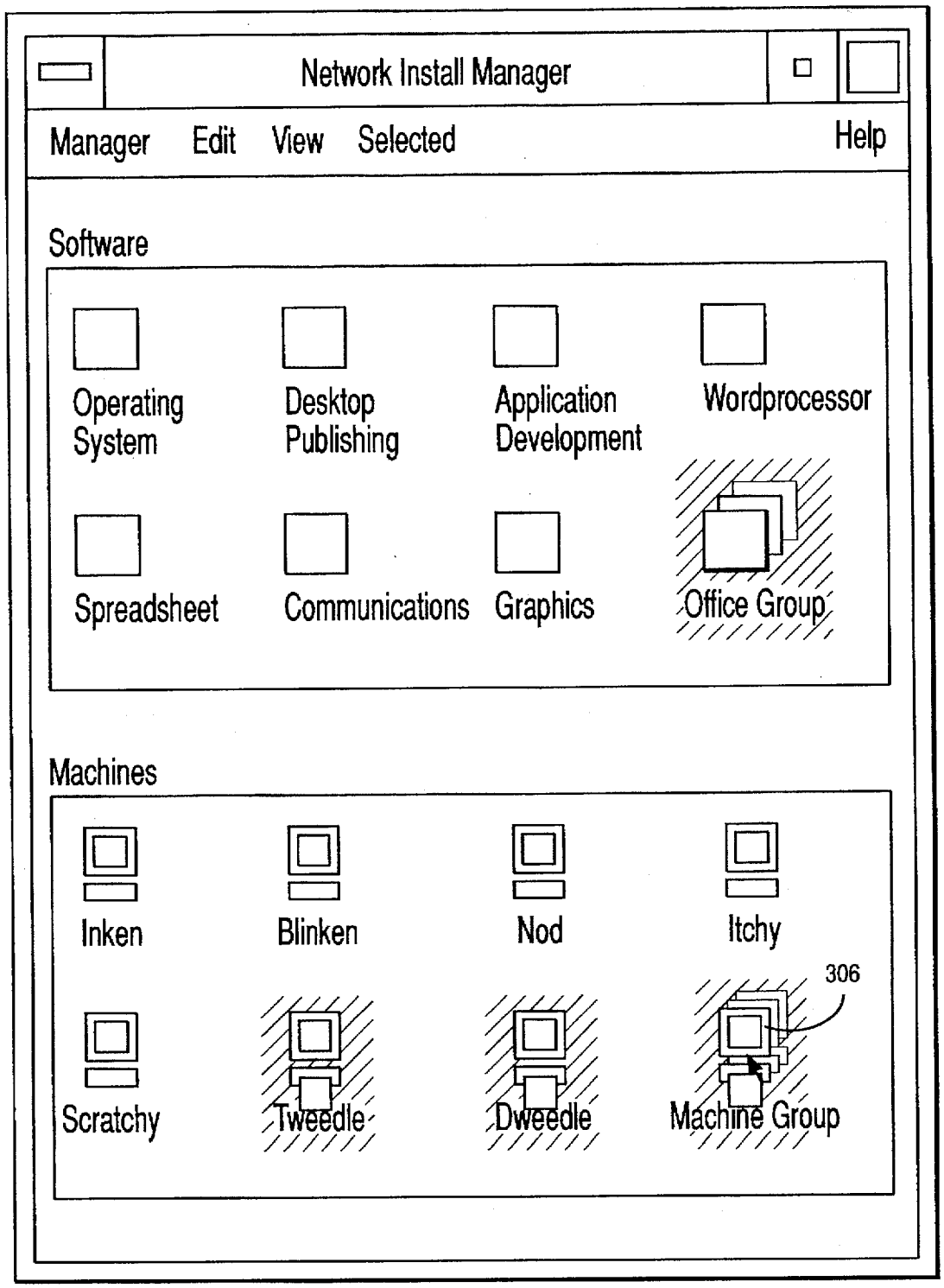

Referring to FIG. 3K, as previous described, drop animation could preferably indicate the consequence of the action (e.g., loading software) on the icons representing both the group and machines included in the group, such drop animation being effected in the machine group 306 area.

Figure 3L:
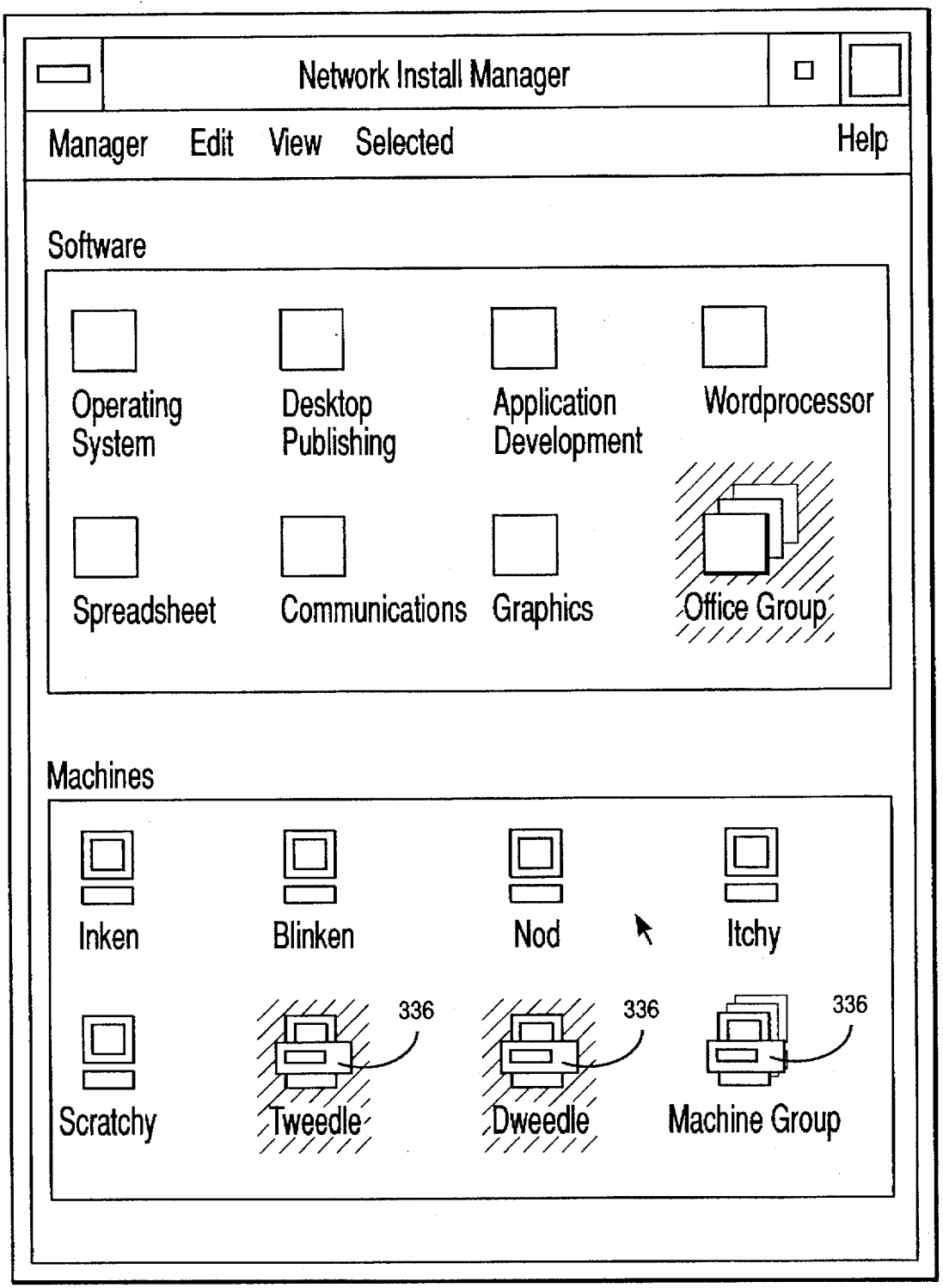

Finally, with respect to FIG. 3L, in like manner to the example for FIG. 2, visual feedback may be provided such as the disk drives 336, indicating that the install action is in progress.

It will be readily appreciated that in each of the methods hereinabove described with reference to FIGS. 2 and 3, when source objects are dropped on target objects, one or more source objects might fail to apply to one or more target objects. In these instances, the application may take a variety of actions as desired. These may include failing the actions for all sources on all targets; failing the actions for a source on all targets if that source fails on any target; and failing only the actions for incompatible source-target combinations. Depending upon the task requirements for the application, the application could perform any of these alternatives, or query the user for the preferred behavior.

Figure 4:
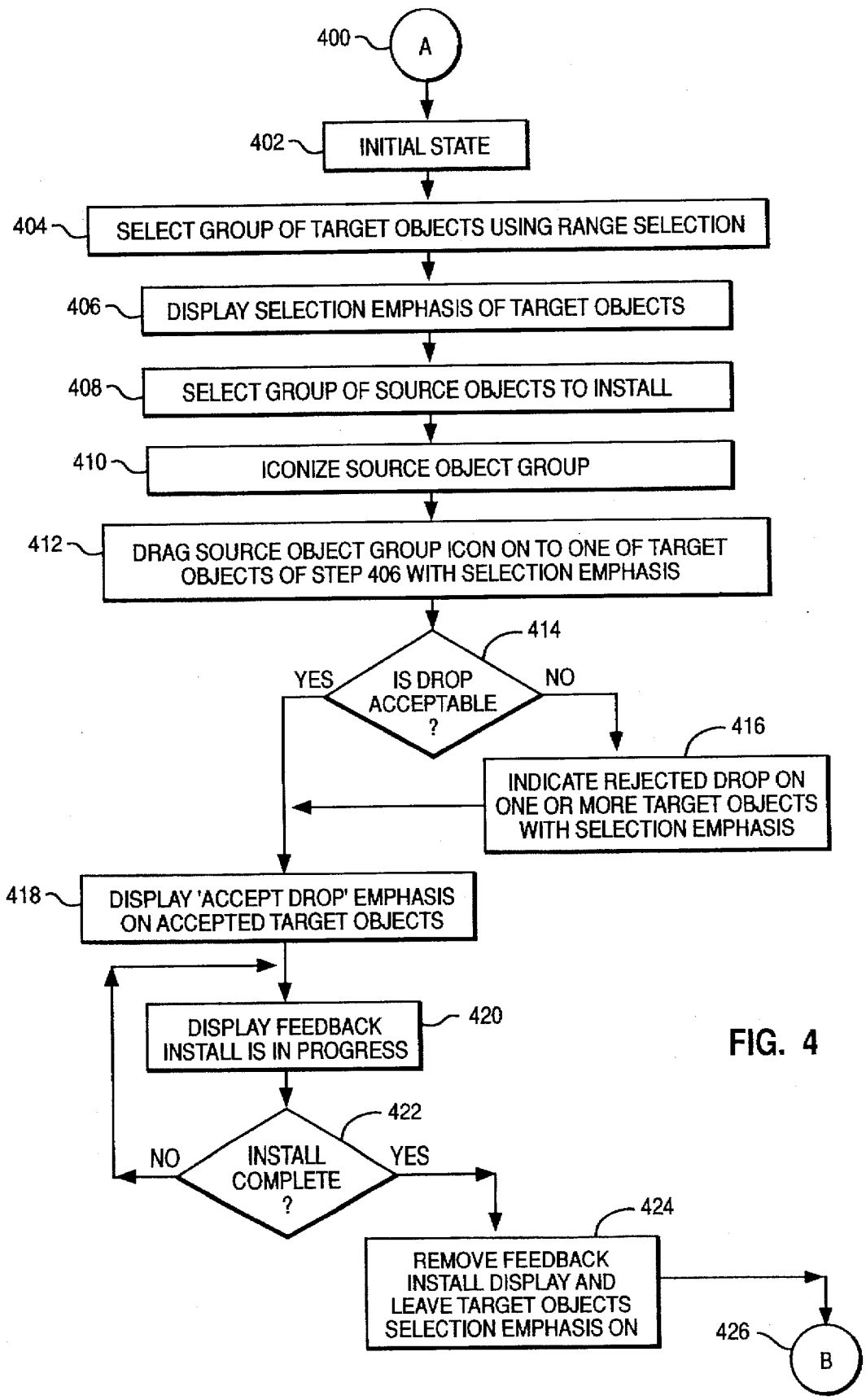
FIG. 4 is a flow diagram illustrating the flow of an operating system or application program implementable on the system of FIG. 1 for effecting the interaction of source objects with multiple simultaneous target objects in accordance with the invention.

Turning now to FIG. 4, a flow diagram is shown there, suitable for implementation in program code to effect simultaneous multiple target installs in the manner of the invention as per the example of FIG. 2 and FIG. 3. This program code would execute on the CPU 10 of FIG. 1A and, if implemented in the network of FIG. 1B, would, in like manner, execute on CPUs of the corresponding computers 42–42C of the network as shown in FIG. 1B. In response to a call from the application or operating system running on the computer, the subroutine is entered at point A, 400. At this point an initial state 402 is displayed on the appropriate display such as display 38, FIG. 1A. Next, in response to a user selection, the program will register that a select group of target objects has been selected using some appropriate range selection, 404 (shown graphically in FIG. 2B, for example).

Next, per step 406 of the flow diagram, selection emphasis will be provided of these selected target objects, whereupon a user will next selected a group of source objects desired to be installed in multiple targets per the invention. Accordingly, the program will register this selection of the group of source objects to be installed, 408, whereupon the fact that a source object group has been selected will be iconized, preferably such that the pointer will be changed in shape for example into an icon which can then be dragged and which represents the thus-selected source object or objects. This iconization step is shown at block 410, FIG. 4.

The user will then drag this source object group icon onto one of the target objects selected in step 406, having the selection emphasis, the program effecting visually the appearance of the dragging of the source icon onto the target objects, 412 (the endpoint of the drag being shown in FIG. 2F).

Next, the program will make a determination of whether the desired drop manifested by the source object selection and dragging to a target is acceptable, given the attributes of the particular source and target objects. This step is shown at decision block 414, FIG. 4. If the drop is determined as not being acceptable, the program will cause visual indication on the display 38, indicating a rejected drop on one or more target objects with selection emphasis, step 416 of FIG. 4 (this rejection also being shown in FIG. 2I).

After the process has indicated graphically rejected drops, if any, flow continues to block 418 whereupon the process causes a display of an "accept drop" on accepted target objects (also shown in FIG. 2I). Next, display feedback is provided that the install is in progress, 420, as shown for example in FIG. 2J by the disk drives appearing on the target objects in which the install is occurring. Next the process queries whether the install has been complete, shown by the decision box 422. If not, the process loops back to continue displaying the feedback that the install is in progress, 420, whereupon eventually the install is completed, as detected by the decision box 422, in which case the process flow exits to the right of the box. The feedback install display caused at block 420 is then removed, and the target object(s) selection emphasis is left on for further interaction with the selected target objects as desired, shown at block 424, whereupon the routine exits at point B, 426, with a return to control of the function calling the routine, shown in FIG. 4.

While the invention has been shown and described with reference to particular embodiments thereof, it will be understood by those skilled in the art that the foregoing and other changes in form and detail may be made therein without departing from the spirit and scope of the invention.

We claim:

1. A computerized method for graphically facilitating interaction of one or more source objects with multiple target objects utilizing a graphic user interface in a computer network, comprising:

registering selection of said one or more source objects in said interface by selecting one from a group comprised of one of said selected source objects or a source container object associated with a plurality of selected source objects;

registering selection of said multiple target objects as a subset of a target objects in said interface by selecting one from a group comprised of one of said selected target objects or a target container object associated with a plurality of selected target objects; and initiating interaction of said one or more source objects with said subset of multiple target objects in response to an action in said graphic user interface, said interaction comprising moving said selected one from a group comprised of said one of said selected source objects or said source container object onto said one of said group comprised of said one of said selected targets or said target container object, and wherein in response to said interaction said one of said selected target objects registers acceptance or rejection of one or more of said selected source objects;

in response to said registering by said one of said selected target objects and said acceptance of said one or more of said selected source objects, at least one of said selected target objects registers in said graphical user interface a visual indication of an ongoing process of said one or more of said selected source objects onto said selected one of said target objects; and upon termination of said install process, said at least one of said selected target objects having said visual indication of said ongoing install remains with a visual indication of being said selected one of said target objects.

2. The method of claim 1 wherein said registering selection of said one or more source objects comprises establishing a source container around a subset of source objects;

wherein said step of registering selection of said multiple target objects comprises establishing a target container around a plurality of target objects; and wherein said interaction comprises moving an icon representing said source container to said target container on said interface.

3. The method of claim 1 wherein said registering selection of said one or more source objects comprises establishing a source container around a plurality of source objects;

wherein said step of registering selection of said multiple target objects comprises establishing a target container around a plurality of target objects; and wherein said action comprises moving an icon representing said source container onto one of said plurality of target objects in said target container.

4. An apparatus for graphically facilitating interaction of one or more source objects with multiple target objects utilizing a graphic user interface in a computer network, comprising:

means for registering selection of said one or more source objects in said interface comprising means for selecting one from a group comprised of one of said selected source objects or a source container object associated with a plurality of selected source objects;

means for registering selection of said multiple target objects as a subset of a target objects in said interface comprising means for selecting one from a group comprised of one of said selected target objects or a target container object associated with a plurality of selected target objects; and means for initiating interaction of said one or more source objects with said subset of multiple target objects in response to an action in said graphic user interface comprising means for moving said selected one from a group comprised of said one of said selected source objects or said source container object onto said one of said group comprised of said one of said selected targets or said target container object; and wherein in response to said interaction, said one of said selected target objects registers acceptance or rejection of one or more of said selected source objects;

in response to said means for registering by said one of said selected target objects and said acceptance of said one or more of said selected source objects, at least one of said selected target objects registers in said graphical user interface a visual indication of an ongoing process of said one or more of said selected source objects onto said selected one of said target objects;

upon termination of said install process, said at least one of said selected target objects having said visual indication of said ongoing process remains with a visual indication of being said selected one of said target objects.

5. The apparatus of claim 4 wherein said means for registering selection of said one or more source objects comprises means for establishing a source container around a subset of source objects;

wherein said means for registering selection of said multiple target objects comprises means for establishing a target container around a plurality of target objects; and wherein said means for initiating interaction comprises means for moving an icon representing said source container to said target container on said interface.

6. The apparatus of claim 4 wherein said means for registering selection of said one or more source objects comprises means for establishing a source container around a plurality of source objects;

wherein said means for registering selection of said multiple target objects comprises means for establishing a target container around a plurality of target objects; and wherein said action comprises moving an icon representing said source container onto one of said plurality of target objects in said target container.

7. A computer program product for use with a graphics display device comprising:

a computer usable medium having computer readable program code means embodied in said medium for graphically facilitating interaction of one or more source objects with multiple target objects utilizing a graphic user interface in a computer network;

computer readable program code means for registering selection of said one or more source objects in said interface comprising computer readable program code means for selecting one from a group comprised of one of said selected source objects or a source container object associated with a plurality of selected source objects;

computer readable program code means for registering selection of said multiple target objects as a subset of a target objects in said interface comprising readable code means for selecting one from a group comprised of one of said selected target objects or a target container object associated with a plurality of selected target objects; and computer readable program code means for initiating interaction of said one or more source objects with said subset of multiple target objects in response to an action in said graphic user interface comprising computer readable program code means for moving said selected one from a group comprised of said one of said selected source objects or said source container object onto said one of said group comprised of said one of said selected targets or said target container object; and wherein in response to said computer readable program code means for registering by said one of said selected target objects and said acceptance of said one or more of said selected source objects, at least one of said selected target objects registers in said graphical user interface a visual indication of an ongoing process of said one or more of said selected source objects onto said selected one of said target objects; and upon termination of said process, said at least one of said selected target objects having said visual indication of said ongoing process remains with a visual indication of being said selected one of said target objects.

8. The computer program product of claim 7 wherein said computer readable program code means for registering selection of said one or more source objects comprises computer readable program code means for establishing a source container around a subset of source objects;

wherein said computer readable program code means for registering selection of said multiple target objects comprises computer readable program code means for establishing a target container around a plurality of target objects; and wherein said computer readable program code means for initiating interaction comprises computer readable program code means for moving an icon representing said source container to said target container on said interface.

9. The computer program product of claim 8 wherein said computer readable program code means for registering selection of said one or more source objects comprises:

computer readable program code means for establishing a source container around a plurality of source objects;

wherein said computer readable program code means for registering selection of said multiple target objects comprises computer readable program code means for establishing a target container around a plurality of target objects; and wherein said action comprises computer readable program code means for moving an icon representing said source container onto one of said plurality of target objects in said target container.

* * * * *